United States Patent [19]

Shoji et al.

[11] Patent Number: 4,939,530
[45] Date of Patent: Jul. 3, 1990

[54] MULTI-COLOR IMAGE FORMING APPARATUS

[75] Inventors: Hisashi Shoji; Satoshi Haneda; Kunihisa Yoshino, all of Tokyo, Japan

[73] Assignee: Konica Corporation, Tokyo, Japan

[21] Appl. No.: 393,026

[22] Filed: Aug. 10, 1989

Related U.S. Application Data

[62] Division of Ser. No. 171,836, Mar. 22, 1988, Pat. No. 4,884,149.

[30] Foreign Application Priority Data

Mar. 26, 1987 [JP] Japan .................................. 62-72810
Mar. 30, 1987 [JP] Japan .................................. 62-76978
Mar. 30, 1987 [JP] Japan .................................. 62-76979
Apr. 9, 1987 [JP] Japan .................................. 62-88138
Apr. 9, 1987 [JP] Japan .................................. 62-88139
Jun. 22, 1987 [JP] Japan .................................. 62-156335

[51] Int. Cl.⁵ ........................ G01D 15/06; H04M 1/32
[52] U.S. Cl. .................................... 346/157; 358/409
[58] Field of Search ............... 346/157, 160; 358/300, 358/409, 903

[56] References Cited

U.S. PATENT DOCUMENTS 4,200,867  4/1980  Hill ..................................... 358/903
4,675,704  6/1987  Yamamoto ......................... 346/160
4,675,746  6/1987  Tetrick et al. .................. 346/160 X
4,791,492 12/1988  Nagashima et al. ............... 358/409

Primary Examiner—Donald A. Griffin
Attorney, Agent, or Firm—Jordan B. Bierman

[57] ABSTRACT

The object of the present invention is to provide an image forming apparatus capable of enabling high-speed continuous copy of an same single-color image, wherein the apparatus is incorporated with a shift register between an image reader and a laser beam generated for performing imagewise exposure onto a photoreceptor. The shift register has a circulation circuit connecting between an output and an input side thereof. After an image data corresponding to a sheet of original document is inputted into the shift register, the circulation circuit is actuated and circulates the image data, thereby repeatedly outputting the image data to the laser beam generator by the number of required times.

9 Claims, 19 Drawing Sheets

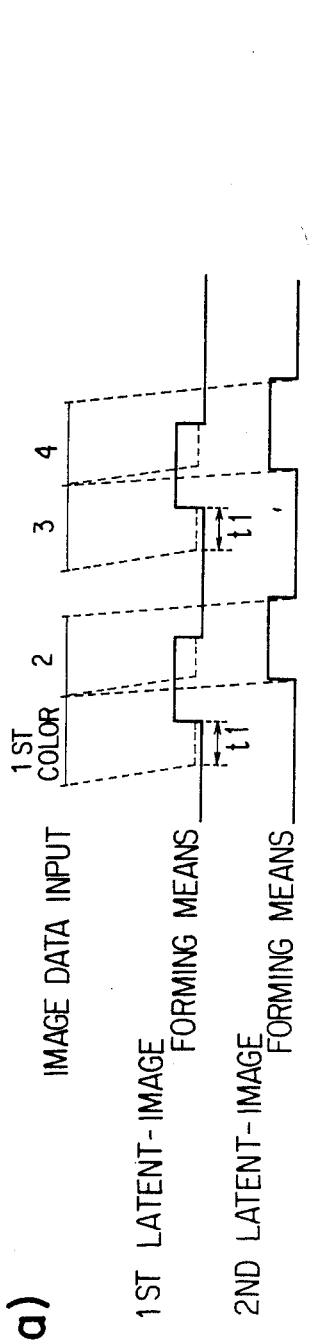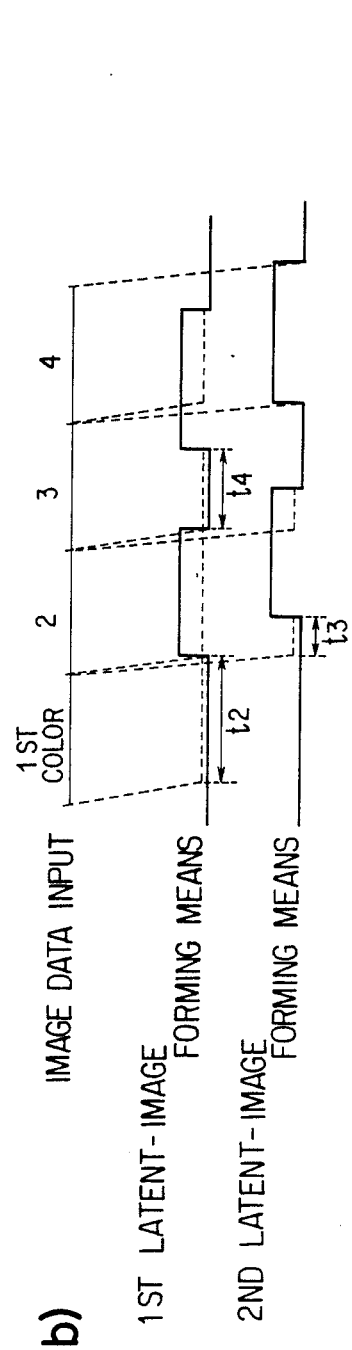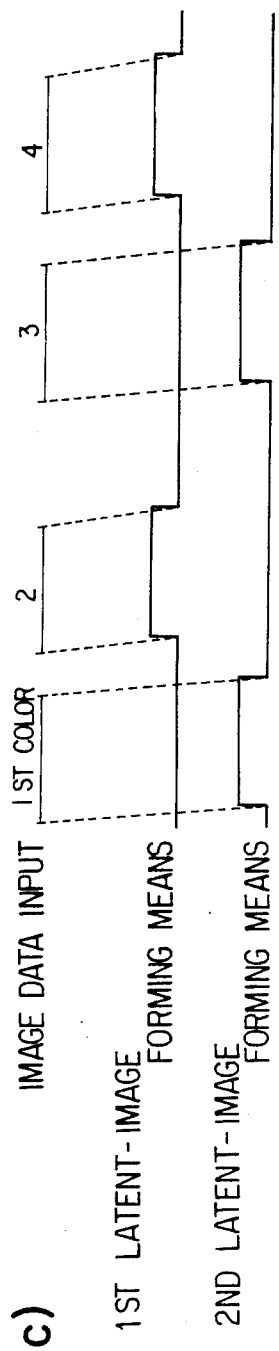
FIG.8-(a)
FIG.8-(b)
FIG.8-(c)

FIG.11-(a)
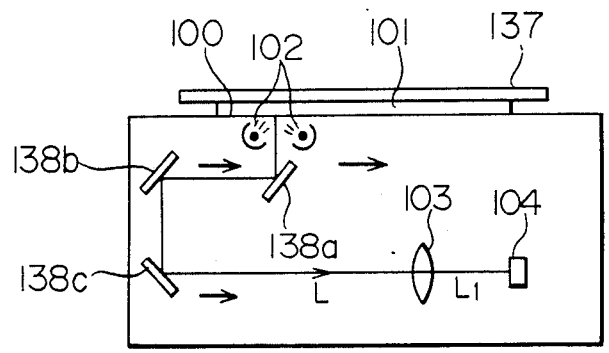
FIG.11-(b)
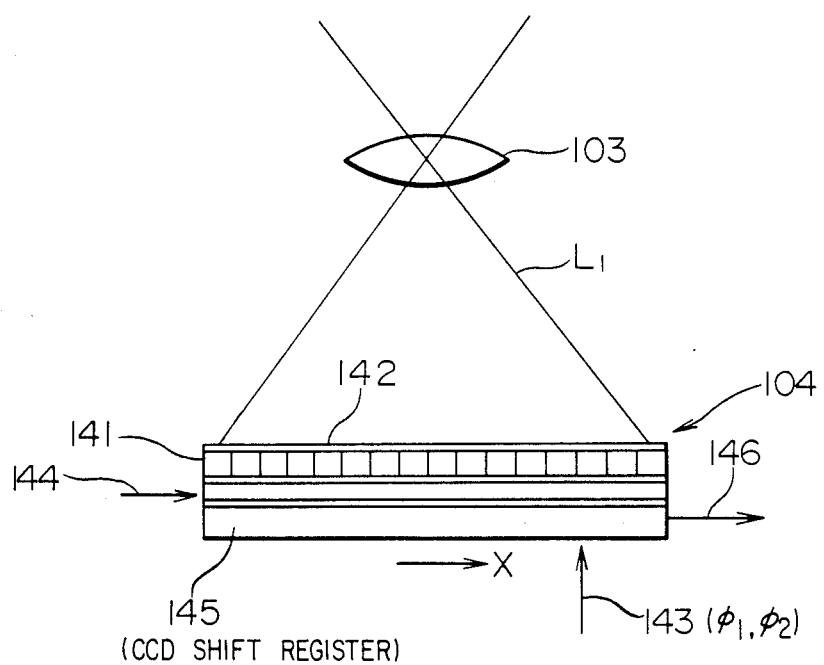

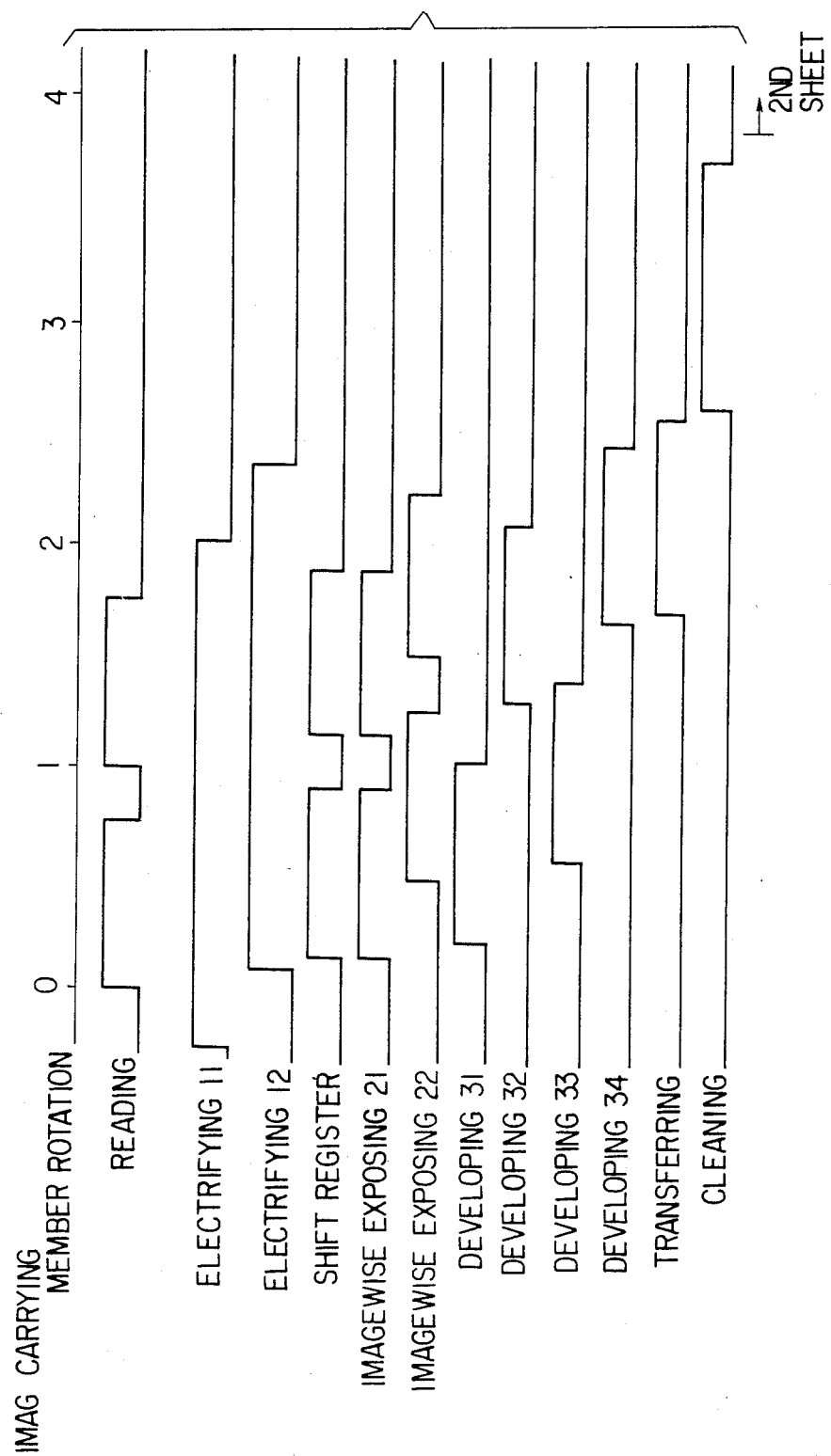

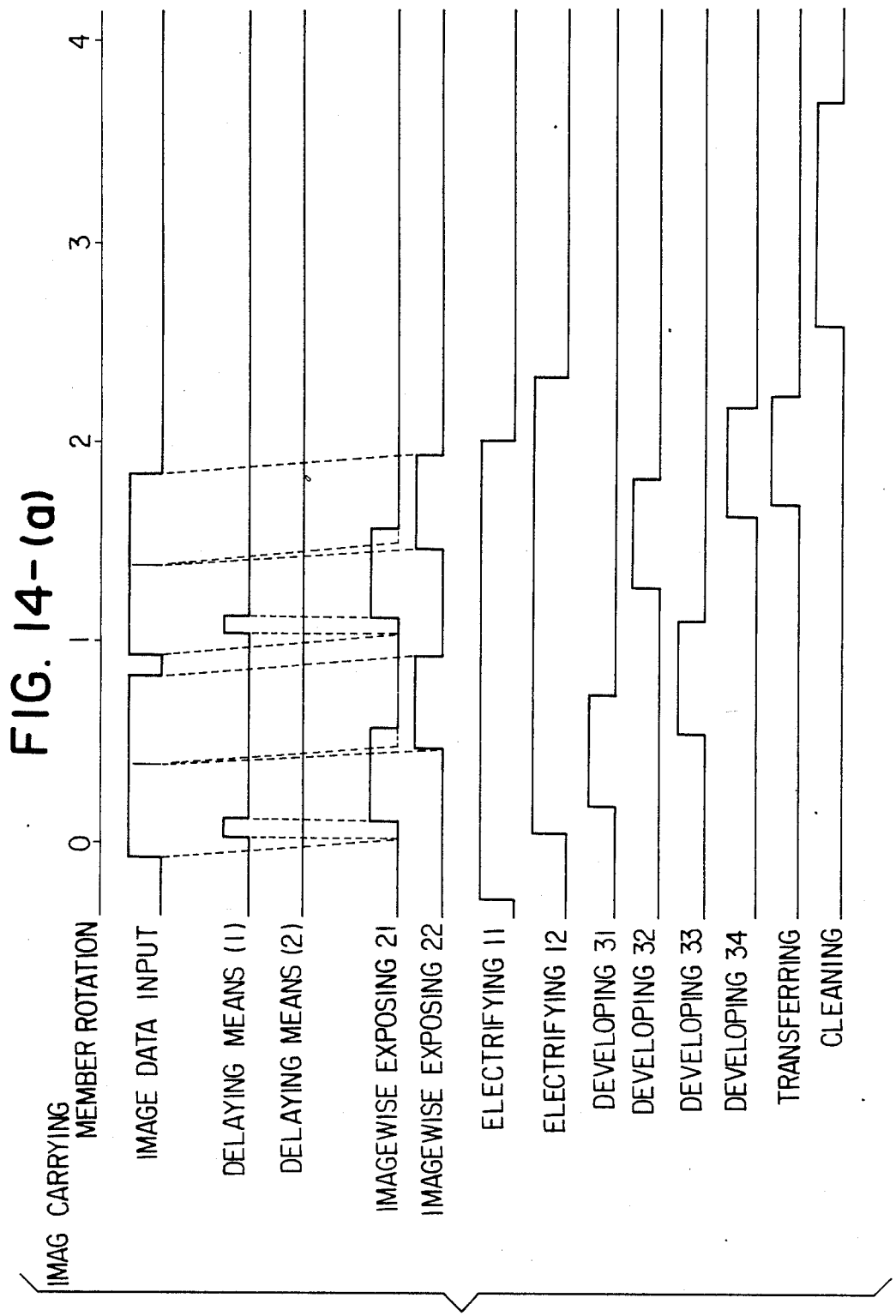

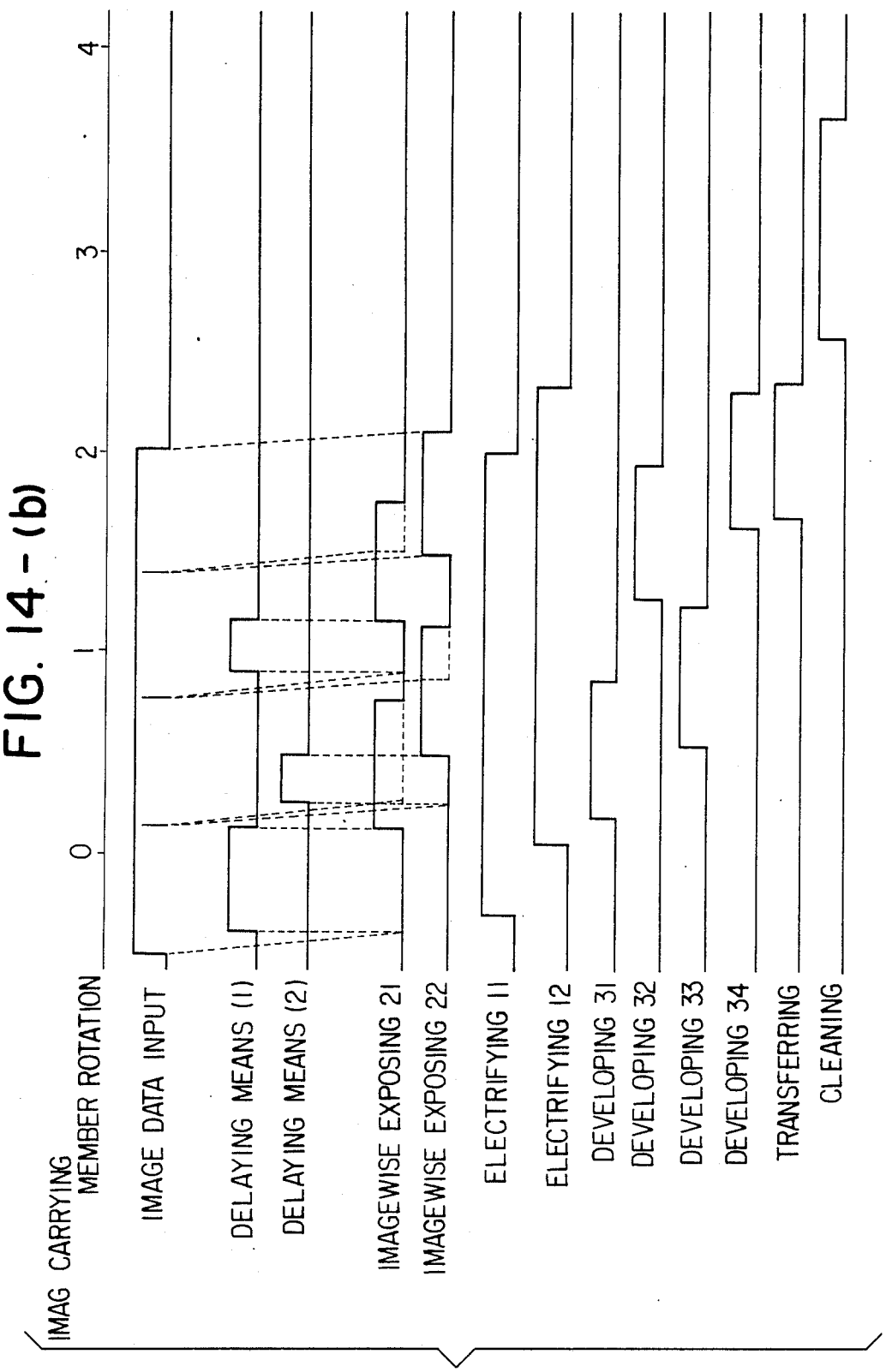

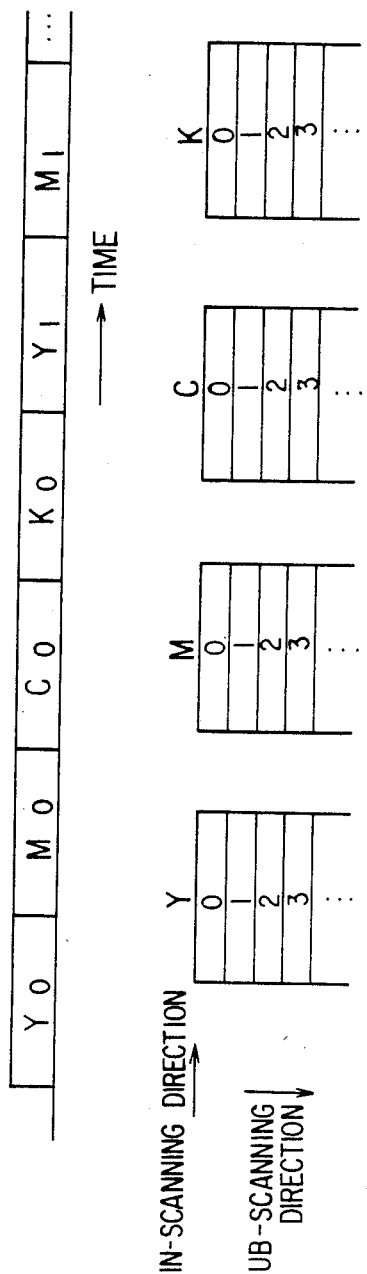
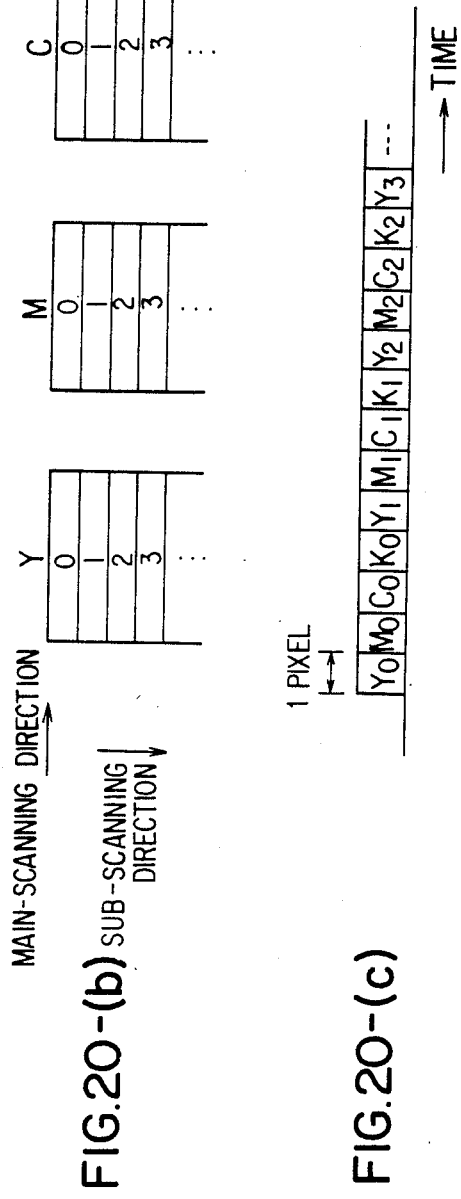
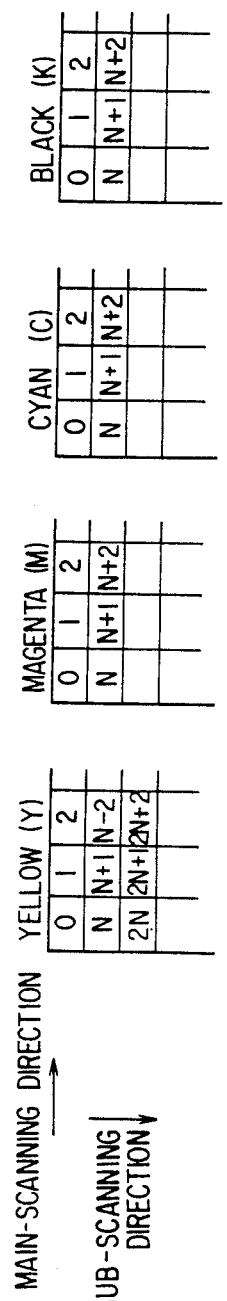
FIG.20-(a)
FIG.20-(b)
FIG.20-(c)
FIG.20-(d)

MULTI-COLOR IMAGE FORMING APPARATUS

This application is a Division of application Ser. No. 171,836, filed Mar. 22, 1988 and now U.S. Pat. No. 4,884,149 issued Nov. 28, 1989.

BACKGROUND OF THE INVENTION

The present invention relates to an improved image forming means for an image forming apparatus which forms a visual image, according to electrophotography, on an image carrying member based on image signals.

FIG. 18 illustrates one typical example of a series of multi-color image forming process for a conventional multi-color image forming apparatus. The basic process of multi-color image forming was disclosed, for example, in Japanese Patent Open to Public Inspection (hereinafter referred to as Japanese Patent O.P.I. Publication) No. 76766/1985. FIG. 18 schematically illustrates the similar process.

FIG. 18 shows changes in potential on an image carrying member, when an electrifying unit uniformly electrifies the surface of the image carrying member and then the imagewise exposing is performed with an image exposing portion. The electrifying unit and the image exposing portion constitute an electrostatic latent image forming means. PH, DA, T1 and DUP in FIG. 18 are as follows: PH represents an exposure portion on the image carrying member; DA represents a non-exposure portion on the image carrying member; T1 denotes a toner adhered to the image carrying member due to a first development; and DUP denotes change in potential caused by toner T1 adhered to the exposure portion PH due to the first development. To facilitate easy understanding, the polarity of the latent image is assumed as positive.

In Process 1, the image carrying member is uniformly electrified by the electrifying unit or the like and has positive potential E.

In Process 2, a first imagewise exposing is performed by a laser or the like, and the potential of the exposure portion decreases according to the light amount.

In Process 3, the electrostatic latent image formed as described above is developed by a developing means which is provided with positive bias virtually equal to the surface potential E of the non-exposure portion.

As a result, the positively-charged toner T1 adheres to the exposure portion PH having comparatively low potential, and forms a first toner image. The potential of the area in which the toner image is formed increases as much as DUP. However, potential of the area wit the toner image normally does not reach to that of the non-exposure portion.

In Process 4, the surface of the image carrying member bearing the first toner image is electrified again by the electrifying unit. Consequently, the surface of the image carrying member is given uniform surface potential E, regardless of the presence or absence of the toner T1.

In Process 5, the second imagewise exposing is performed on the surface of the image carrying member, forming an electrostatic latent image.

In Process 6, similar to the Process 3 above, toner T2 (independent of the toner T1) is developed so as to from a second toner image. The toner T2 is also positively charged.

To form a multi-color toner image on the image carrying member, the processes mentioned above are repeated for required times. Then, the resultant multi-color toner image is transferred onto a transfer material, thereby heat or pressure is exerted, for fixing, on the transferred image. Thus, a multi-color image is formed.

Referring now to the block diagram in FIG. 19, a multi-color image forming apparatus, which has been disclosed by the present inventors, having the functions mentioned above is described in detail. The light information of a document 5 is fed into three photosensors 523, 524 and 525 via filters B, G and R from an image information input portion 502. As a result, the light information is separated into three independent color signals $I_B$, $I_G$ and $I_R$ and entered into a recording-data data generating portion 503. In the recording-data generating portion 503, recording data $D_Y$, $D_M$, $D_C$ and $D_K$ are formed. The recording data $D_Y$, $D_M$, $D_C$ and $D_K$ are generated and outputted in parallel. More specifically, yellow, magenta and cyan components of a specific pixel on a screen are simultaneously generated. Sitches 5-$S_1$ and 5-$S_2$ are selectors to choose which of recording data $D_Y$, $D_M$, $D_C$, and $D_K$ is transmitted to latent image forming means or light exposure means 521 and 522. These switches $S_1$ and $S_2$ are selectively driven by switching signals from the CPU 509.

Recording data ($D_M$ or $D_C$) selected by the switch 5-$S_1$ is transferred to the latent image forming means 521 (e.g. laser beam scanner) which promptly performs imagewise exposure to form latent image corresponding to the recording data ($D_M$ or $D_C$). In contrast, recording data ($D_Y$ or $D_K$) selected by the switch $S_2$ is temporarily stored in a shift register 506. The shift register 506 transmits the stored data to a latent image forming portion 522 after a specific duration equal to a required time for the image carrying member or photoreceptor of a positive image forming means 528 to travel rotatively the distance from the latent image forming means 521 to the similar means 522. As a result, the stored recording data is transmitted to the latent image forming means 522, after a delay which corresponds with the distance between the two latent image means. According to the above arrangement, the latent images formed by the latent image forming means 521 and 522 are exactly aligned with each other so that independent color images are formed in the same position on the photoreceptor of the positive image forming portion 528. The positive image forming portion 528 develops the latent images thereon. A duplicate is completed by fixing the developed image after transferring them to a transfer sheet P.

Using this methods, an image is formed on a image carrying member based on electric signals. In this case, a laser, LED, liquid crystal shutter or similar means controlled by electric signals is used as image exposing means. This type of apparatus (digital image forming apparatus) not only has copying function, but also has advanced functions such as image storage, editing and communication. The conventional copying apparatus, which directly forms a document reflection image on an image carrying member, does not have these advanced functions.

However, the aforementioned process incurs problems. The first problem is as follows: when continuously forming many duplicates of an image from an same document by using the image forming apparatus above, the image information input portion 502, the recording-data generating portion 503 and other portions have to be repeatedly energized per duplicate, resulting in shorter service lives of elements and components constituting these portions, as well as larger power consumption for driving each portion. Furthermore, since copying time increases in proportion to the number of copies being prepared, large volume copying requires extended duration of time for completing copying. In regard to the service lives of the elements and components, power consumption and time required for copying, the apparatus above especially has a problem that all the portions (including the image information input portion 502 and recording-data generating portion 503) have to be driven per duplicate even for a single color duplicate using one color toner.

When used as a copying apparatus, the multi-color image forming apparatus may be capable of performing high-speed image forming by parallelly accepting image data.

When entering image data from an external unit for storing, editing and communicating image data, the image data may not be parallel, unlike that transferred from an image reader, in some cases, and signals of each color component may be transmitted in the following format. FIG. 20 shows examples of the format of image data. In FIG. 20-a, Y (yellow), M (magenta), C (cyan) and K (black) are alternatively transferred per one line of an image. To identify the end of a one line data, several-bit-configured data may be incorporated as a control signal following the one line data. On the actual screen, data are arranged as described in FIG. 20-b. The data format as shown in FIG. 20b is hereinafter referred to as the line sequential. Likewise, the color components of image data may be transferred per pixel as shown in FIG. 20-c. On the actual screen, the data are arranged as described in FIG. 20-d. (N corresponds with the number of pixels on one line in the main scanning direction.) The data format as shown in FIG. 20-d is hereinafter referred to as the dot sequential. In some cases, independent color components on one screen may be alternatively transferred per screen. This type is hereinafter referred to as the screen sequential. These types of image data are completely different from that entered by the image reader. Therefore, data processing function shown in FIG. 19 cannot cope with the above-mentioned format of image data.

SUMMARY OF THE INVENTION

To solve the first problem, the object of the present invention is to provide an image forming apparatus which enables high-speed continuous duplicating of an same single-color image, with longer service lives of components and reduced power consumption, wherein the image forming apparatus comprises a shift register 506 having a feed-back circuit connecting an output side to an input side, and a switching means for selecting recording data outputted from a recording data generating portion 503 or feed-back signal as input data to the shift register 506, whereby, for continuous recording of many duplicates of an same single-color image, after once recording data corresponding to a sheet of copy paper are fed into the shift register 506, the signal input from the recording-data generating means is blocked, and then the output signal of the shift register 506 is returned to the input terminal on the shift register 506 so as to repeatedly transmits the same output signal to the latent image forming means, thus the continuous image recording is achieved without operating the image information input portion 502 and recording-data generating portion 503 per duplicate.

To achieve this object, the image forming apparatus embodying the present invention has the following constitution: an image information input portion which reads image information; a recording-data generating portion as a processing means which performs signal processing for the read-out data and produces recording data for one or a plurality of specific image data components; and rotatable image carrying member; one or more latent image forming means as a light exposure means which form a latent image on the image carrying member, based on the recording data generated by the recording-data generating means; one or more developing means which develop the formed latent image, by using a toner, to form a toner image; and a transfer means which transfers the toner image on the image carrying member onto a transfer material such as a copy paper; wherein the image forming apparatus according to the invention comprises a record data transmission means having a shift register which receives the recording data from the recording-data generating means and transmits the received recording data to the latent image forming means with a delay, or stores the received recording data and repeatedly transmits the stored recording data to the latent image forming means; and a switching means which is selectively driven to directly feed the recording data from the recording-data generating means into the latent image forming means, or to transmit the recording data from the recording-data generating means with a delay by using the shift register, or to block the signal input from the recording-data generating means, once the recording data of one duplicate are fed into the shift register, in order to return and re-feed the output signal of the shift register to the input terminal on the shift register so as to repeatedly transmit the output signal to the latent image forming means.

The effect of the image forming apparatus having such a constitution according to the present invention is described below. For the convenience of description, it is assumed that the apparatus embodying the present invention has two latent image forming means.

Regardless of recording mode, the image information acquired by the image information input portion is converted into electrical signals, and separated into independent image information component so as to form multi-value recording data. When forming a multi-color image, a recording data corresponding to an color component of an image information is directly fed into the first latent image forming means, included in the latent image forming means, from the recording-data generating means. The shift register transfers another recording data corresponsing to another color component of the image information to the second latent image forming means with a delay i.e. a duration which is required for the image carrying member to travel from the first latent image forming means to the second latent image forming means. Consequently, a multi-color image is formed on the image carrying member by superposing above color components.

For single-color high-quality image recording, the recording data are directly transferred from the recording-data generating means to the latent image forming means in order to form a high-quality image on the image carrying member.

When continuously producing a plurality of copies of identical single-color image from a same original image, the recording data of one duplicate are fed into the shift register, and then, a following signal input of another duplicate from the recording-data generating means is blocked and the output signal from the shift register is returned and recursively transmitted to the latent image forming means. As a result of the recursive output transfer, an identical latent image is repeatedly formed on the image carrying member, thereby the developing means recursively forms an identical toner image, based on the formed latent image.

Regardless of a recording mode, the toner image is always transferred to a transfer material by a transfer unit.

Selecting a recording mode mentioned above is performed by a switching means which is incorporated to allow the shift register to be externally switched.

The apparatus, as described above, is capable of recording a multi-color image as well as a single-color high-quality image. Furthermore, when continuously recording a large number of an identical single-color image, continuous recording is completed in a shorter duration, without reading image information from a document per duplicate.

To enable image data processing for both parallel image data input and serial image data input, and to ensure high-speed multi-color image forming, the multi-color image forming apparatus embodying the present invention forms a multi-color image, comprising a plurality bf toners respectively having a specific color, on the image carrying member, wherein this image forming apparatus comprises an image information input means which selectively inputs multi-color image data, either parallel or serial; a rotatable image carrying member; at least two latent image forming means which form latent images on the image carrying member, based on the image data; a delaying means connected to the input terminal on at least one of the plurality of the latent image forming means, wherein the delay means feeds the transferred image data into the latent image forming means with a specific delay; at least two developing means which develop the formed latent images; and a controlling portion which controls the operation of each portion on the apparatus, by generating control signals to change swquence of image data transfer, according to the input pattern of the image data.

BRIEF DESCRIPTION OF THE DRAWINGS

FIG. 8 gives timing charts individually showing the operation of the apparatus being corresponsing with the size of input data.

FIG. 11 gives block diagrams of a system using the multi-color image forming apparatus in FIG. 1.

FIG. 13 is a timing chart showing a sequence where the system inputs parallel data.

FIG. 14 gives timing charts respectively showing a sequence where the system inputs serial data; (a) is for a comparatively small sized image data, (b) is for a comparatively large-sized image data.

FIG. 20 describes data format according to a transfer method in which signals of the respective color components are alternatively and sequentially transmitted.

DETAILED DESCRIPTION OF THE INVENTION

Figure 1:
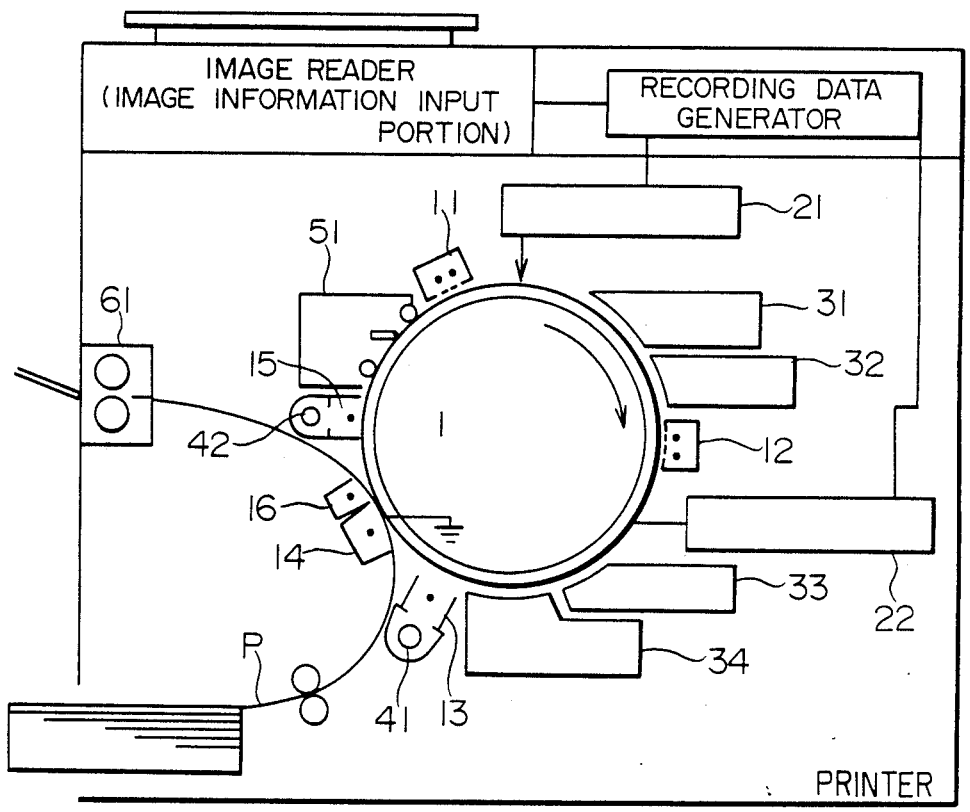
FIG. 1 shows the overall constitution of a multi-color image forming apparatus embodying the present invention.

FIG. 1 illustrates one example of amulti-color image forming apparatus embodying the present invention.

In FIG. 1, numeral 1 denotes an image carrying member, having a photoconductive layer such as of OPC, Se or the like, provided on a drum which rotates in the direction as indicated by the arrow. A document 5 is pressed to an image information input portion 2 by a document presser 4. An image information input portion 2 converts the image data of the document 5 into electrical signals including color signals. The image information converted into electrical signals are digitized by a recording-data generating portion 3 and then formed into recording data comprising independent color components.

Imagewise exposing portions 21 and 22, using a laser beam scanner, respectively form a latent image on an image carrying member 1, based on recording data. Developing units 31, 32, 33 and 34 respectively store one unique toner selected from color toners i.e. yellow, magenta, cyan and black toners. For convenience of description, it is assumed that the developing unit 31 has a cyan toner, the developing 32 has a magenta toner, the developing unit 33 has a yellow toner and the developing unit 34 has a black toner. To promote image transfer to a transfer material P, a pre-transfer exposing lamp 41 and pre-transfer electrifying unit 13, correspondingly, perform pre-exposing and pre-electifying.

A neutralizing lamp 42 and a neutralizing electrode 15 eliminate the residual charge on the image carrying member 1 once image transfer onto the transfer material P has completed.

A cleaning unit 51 is incorporated to remove the residual toner on the image carrying member 1, and to allow the image carrying member 1 to form a latent image corresponding with the next image information.

Electrifying units 11 and 12 are provided to apply uniform charge on the surface of the image carrying member 1.

The operations above are performed as synchronized with a predetermined rotation speed of the image carrying member 1.

A transfer electrode 14 is an electrode for transferring an image formed on the surface of the image carrying member 1 to the transfer material P. A separation electrode 16 is a unit for separating the transfer material P from the surface of the image carrying member 1. A fixing unit 61 fixes the toner transferred to the transfer material P.

Figure 2:
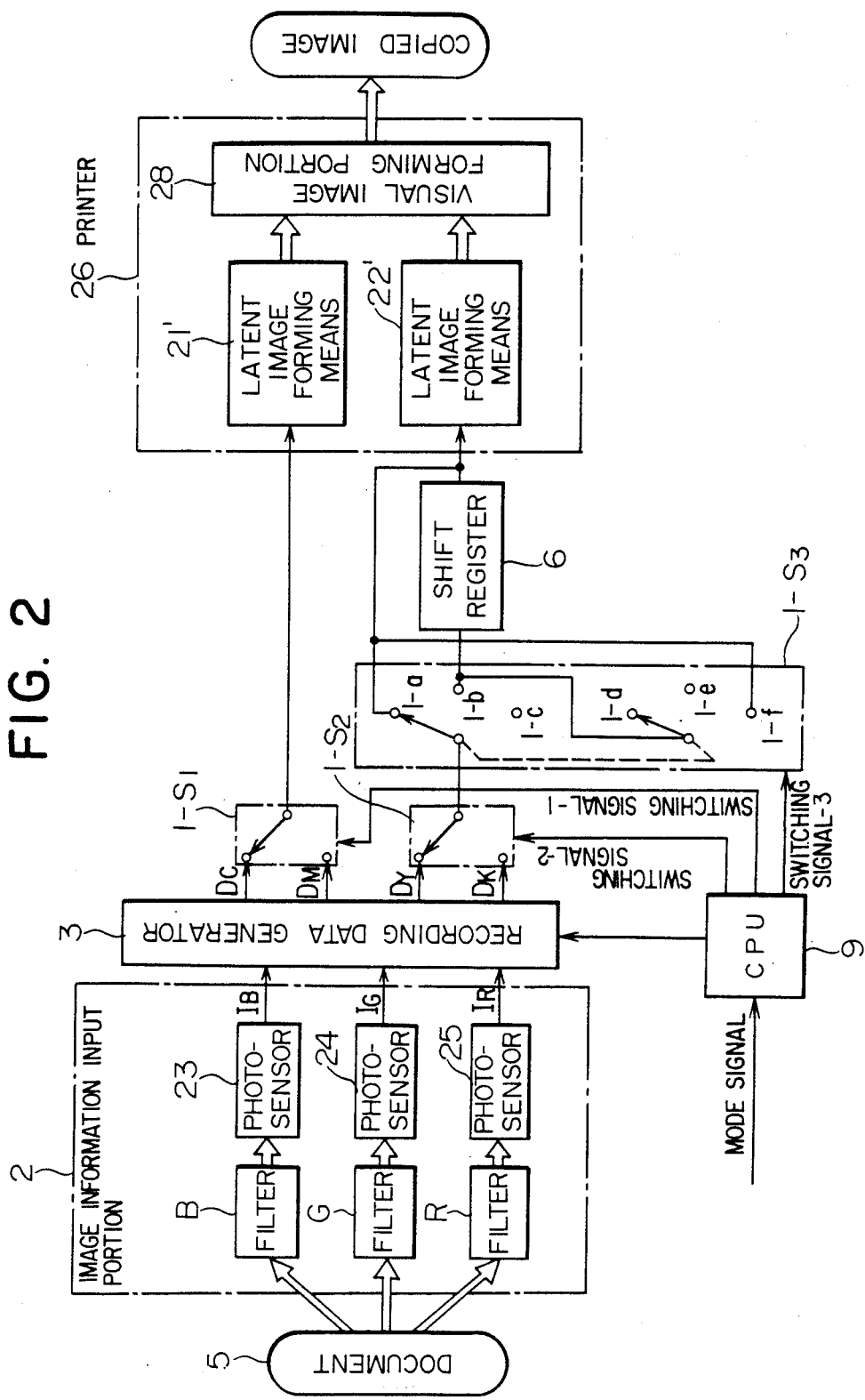
FIGS. 2, 3 and 4 are block diagrams respectively showing one constitution of an apparatus embodying the present invention.

FIG. 2 shows the constitution diagram of the image processing embodying the present invention.

The light information of the document 5 is entered by the image information input portion 2 into three photosensors 23, 24 and 25 via filters B, G and R, and is separated into three independent color signals $I_B$, $I_G$ and $I_R$. These three color signals are then entered into the recording-data generating portion 3. The recording-data generating portion 3 subsequently performs signal processing, such as shading rectifying, gamma correction, enlarging and reducing, and subsequently forms data for four color components (yellow, magenta, cyan and black) by performing masking and UCR processing. The masking and UCR processing allow conformity of reading properties of the image information input portion 2 with recording properties of a printer 26.

Subsequently, binary-coded or multi-value coded recording data $D_Y$, $D_M$, $D_C$ and $D_K$ are formed as output data, according to the dither method, density pattern method or the like.

Each of the recording data $D_Y$, $D_M$, $D_C$ and $D_K$ are parallelly outputted. In other words, yellow, magenta, cyan and black components of a specific pixel on a screen is simultaneously outputted. Switches 1-S$_1$ and 1-S$_2$ are switches for selecting which of recording data $D_Y$, $D_M$, $D_C$ and $D_K$ is transferred to the latent image forming means 21' or 22'. Recording data selected by the switch 1-S$_1$ ($D_M$ or $D_C$) is transferred to the latent image forming means 21' (e.g. laser beam scanner) which promptly forms a latent image on the image carrying member of the visual image forming portion 28.

On the other hand, recording data selected by the switch 1-S$_2$ ($D_Y$ or $D_K$) is transmitted to the latent image forming means 22' via a different route which is, depending on a recording mode, determined based on the switching signal that the CPU 9 generates once it receives the recording mode signal.

In the multi-color image recording mode, contacts 1-$b$ and 1-$e$ on the switch 1-S$_3$ are activated by the switching signal from the CPU 9, thereby the recording data ($D_Y$ or $D_K$) is temporarily stored in the shift register 6.

The shift register 6 transfers the stored recording data to the latent image forming means 22' after a duration required for the image carrying member 1 to travel rotatively from the latent image forming means 21' to the similar means 22'.

Accordingly, the stored recording data are transmitted to the latent image forming means 22' with a delay which is equal to this duration.

Therefore, image positions formed by the latent image forming means 21' and 22' on the image carrying member are accurately aligned with each other. As for the identical-image single-color recording mode, activating contacts 1-$a$ and 1-$d$ on the switch 1-S$_3$ directly transmits the recording data from the recording-data generating portion 3 to the latent image forming means 22', thus, a time required for image inputting through outputting is reduced.

In the identical-image single-color continuous recording mode, continuous recording for many duplicates of a single-color same image is completed, according to the following arrangement, in a shorter duration compared to a conventional copying apparatus. The switching signal from the CPU 9 activates the contacts 1-$b$ and 1-$e$ on the switch 1-S$_3$, thereby the recording data $D_Y$ or $D_K$ for one duplicate from the recording-data generating portion 3 are fed into the shift register 6, and then, the contacts 1-$c$ and 1-$f$ on the switch 1-S$_3$ are energized in order to block the signal input from the recording-data generating portion 3, thereby the output signal of the shift register 6 is returned to the input terminal on the shift register 6 to recursively feed the output signal into the latent image forming means 22'.

As described above, the image forming apparatus according to the invention is provided, between the output terminal on the recording-data generating portion and the input terminal on the latent image forming means, with the transmission means having the shift register and the switching means for selecting a circuit from which includes a by-pass line and a circulating line associated with the shift register. Accordingly, the abovementioned apparatus has the following advantages: in multi-color image recording, a multi-color image is formed by operating the shift register as a means for delaying data transfer; in single-color, high-quality image recording, a high-graduation image is obtained, since the transmission means directly transmits data fed from the recording-data generating portion to the latent image forming portion through the by-pass line of the shift register. Furthermore, when continuously recording an identical single-color image, continuous recording is achieved without actuating the image information input portion and the recording-data generating portion per duplicate. This is because the data are recursively fed and transmitted to the latent image forming means, since the shift register recycles the recording data fed from the recording-data generating portion. As a result, the present invention provides still another advantage; an image forming apparatus requiring smaller power consumption, and of which components having longer service lives.

Then recoring data being fed into the shift register 6 are multi-value coded data, the storage capacity of the shift register 6 may be proportionally large in the apparatus shown in FIG. 2. Accordingly, the increase in storage capacity has a problem regarding the size and cost of the apparatus.

Accordingly, the inventors of the present invention studied the above disadvantage and has made improvement, that is, to enable single-color continuous copying based on multi-value coded recording data, without increasing the storage capacity of the shift register, multi-value coded data are converted into binary data which is allowed to recycle through the shift register, and the recursive outputs from the shift register are re-converted into pseudo-multi-value coded data. The details of the improvement are as follows.

Figure 3:
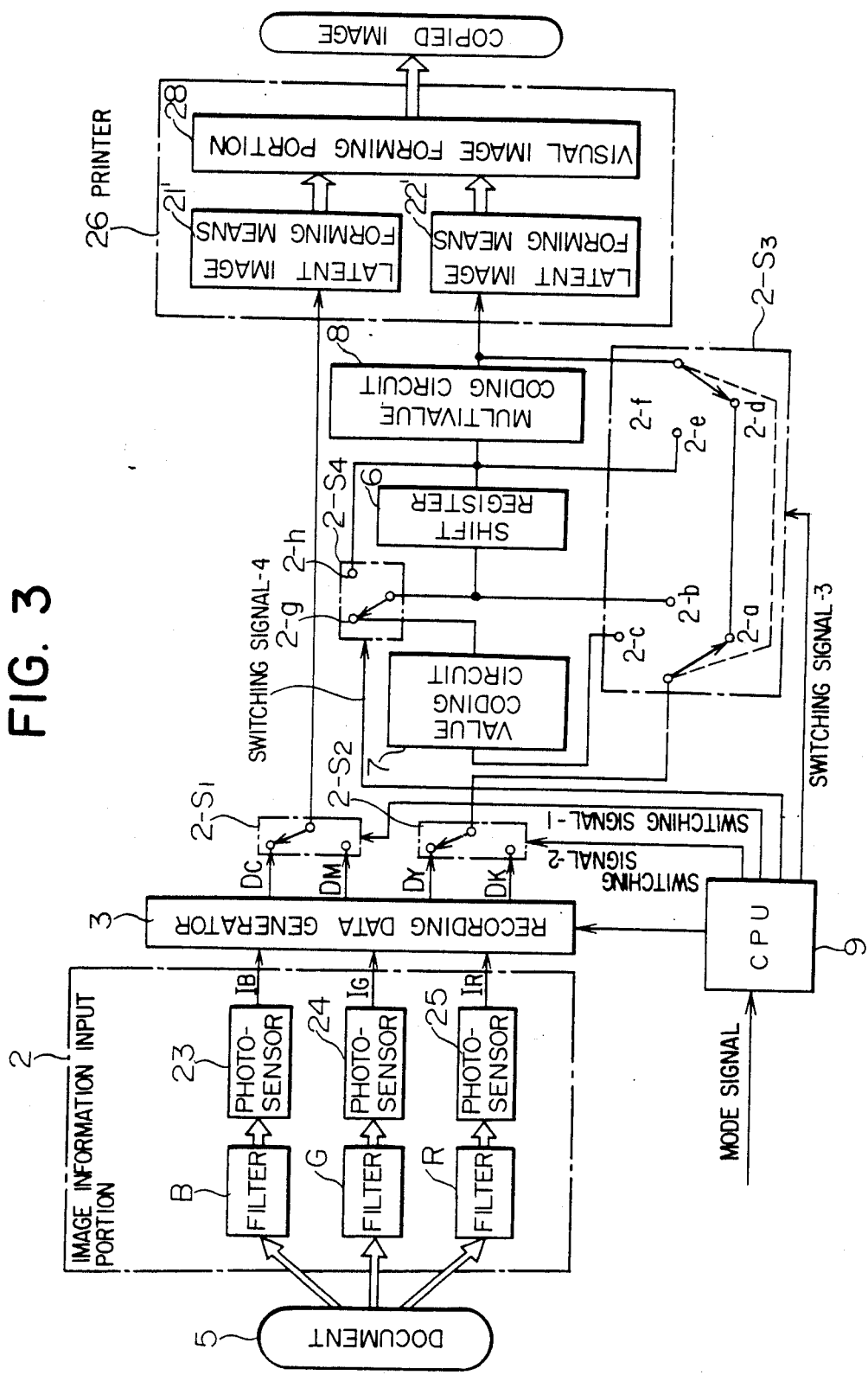

The image forming apparatus shown in FIG. 3 comprises a shift register which receives recording data from the recording-data generating means and transmits the received recording data to the latent image forming means with a delay, or which stores the recording data and recursively transmits the stored recording data to the latent image forming means; a binary coding circuit which converts the multi-value recording data into binary data; a multi-value coding circuit which re-converts the binary data from the shift register into multi-value coded data; and a switching means which is selectively driven, whereby the recording data from the recording-data generating means are directly transmitted to the latent image forming means, or the recording data from the recording-data generating means are transmitted to the latent image forming means after a delay by the shift register, or signal input from the recording-data generating means is blocked and output signal of the shift register is returned to the input terminal of the shift register in order to circulate and recursively feed the output signal into the latent image forming means via the multi-value coding circuit.

The recording modes mentioned above are selected by a switching means which is incorporated to allow external manipulation in regard to connection switching between the binary coding circuit, shift register and multi-value coding circuit.

In FIG. 3, components with like reference numerals have like operations and effects of those in FIG. 2. Numeral 7 denotes a binary coding circuit, and numeral 8 denotes a multi-value coding circuit. The recording data ($D_M$ or $D_C$) selected by a switch 2-$S_1$ are transferred to a latent image forming means (e.g. laser beam scanner) 21' which immediately performs latent image forming.

On the other hand, the recording data ($D_Y$ or $D_K$) selected by a switch 2-$S_2$ are transmitted to the latent image forming means 22' via a different route according to the recording mode.

In the multi-color image recording mode, contacts 2-$b$ and 2-$e$ on a switch 2-$S_3$ are actuated by a switching signal generated by a CPU 9 which has received the mode signal. Likewise, a contact 2-$g$ on a switch 2-$S_4$ is actuated by the switching signal generated by the CPU 9, thereby the recording data ($D_Y$ or $D_K$) are temporarily stored in the shift register 6. The shift register 6 transfers the stored data to the latent image forming means 22' after a duration required for the image carrying member 1 to travel rotatively from the latent image forming means 21' to the similar means 22'. In other words, the recording data are transmitted to the latent image forming means 22' with a delay corresponding with this duration. Therefore, the positions of the images formed by the latent image forming means 21' and 22' are accurately aligned with each other. In the identical-image single-color recording mode, the contacts 2-$a$ and 2-$d$ on the switch 2-$S_3$ are actuated in order to transmit the multi-value coded data from the recording-data generating portion 3 directly to the latent image forming means 22', thus providing a high-graduation image.

In the identical-image single-color continuous recording mode, the contacts 2-$c$ and 2-$f$ on the switch 2-$S_3$ are actuated in order to feed the recording data $D_Y$ or $D_K$ of one duplicate from the recording-data generating portion 3 into the shift register 6 via the binary coding circuit 7, and then the contact 2-$h$ on the switch 2-$S_4$ is actuated to block signal input from the recording-data generating portion 3 in order to feed back the output signal of the shift register 6 to the input terminal on the shift register 6, allowing recursive circulation of the output signal, thereby output signal is recursively fed into the latent image forming means 22' via the multi-value coding circuit 8. Accordingly, the single-color single-image continuous recording for a large number of duplicates is completed in a shorter duration, compared to a conventional apparatus.

As described above, the image forming apparatus according to the invention is provided, between the output terminal on the recording-data generating portion and the input terminal on the latent image forming means, with the shift register and the switching means for selecting a circuit being connected to the shift register. Accordingly, the similar apparatus has the following advantages: in multi-color image recording, a multi-color image is formed by operating the shift register as a means for delaying data transfer; in single-color, high-quality image recording, a high-graduation image is obtained, since the shift register directly transmits data fed from the recording-data generating portion tot he latent image forming portion. Furthermore, when continuously recording an identical single-color image, continuous recording is achieved without actuating the image information input portion and the recording-data generating portion per duplicate. This is because the data, in the form of pseudo-multi-value coded data, are recursively fed and transmitted to the latent image forming means, wherein the shift register does not require a large capacity, since the shift register re-cycles the recording data fed from the recording-data generating portion.

As a result, the present invention provides still another advantage; an image forming apparatus requiring smaller power consumption, and of which components having longer service lives.

In the following section, further improvements made by the inventors are described in detail. When continuously recording many duplicates of identical single-color image by using the apparatus shown in FIG. 2 or 3, the resultant images are formed by recursively transmitting the recording data from the shift register 6. However, the read time (one cycle time of data) of the shift register 6 regarding recording data of one duplicate is determined (assuming that clock pulse intervals are unchanged) based on the number of memory cells disposed between the signal input terminal and the signal output terminal on the shift register 6, regardless of the size of document image.

The number of memory cells on the shift register 6, however, corresponds with the maximum size of document image being processed by the image forming apparatus. Thus, the recursive cycle set for the maximum document image size is unchanged, even when recording data for a smaller document image is processed. Accordingly, a disadvantage arises as the recording time is the same regardless of the size of the document.

To solve this problem, the inventors of the present invention have incorporated a shift register with taps, where intermediate taps are disposed on a memory cell array. By using the shift register with taps, the following improvements are achieved; when the size of a document in the sub-scanning direction is smaller than that corresponding with the total storage capacity in the shift register shifting direction, an appropriate tap is selected to recursively circulate the recording data within the smaller memory cell array in compliance with the size of a document. Thus, when continuously recording an identical single-color image, the recording-data cycle time is reduced, which results in efficient operation with longer service lives of components and reduced power consumption.

The image forming apparatus shown in FIG. 2 or 3 comprises the shift register with taps which receives the recording data from the recording-data generating means and transmits the received data to the latent image forming means with a delay, or which stores the recording data and recursively transmits the stored data to the latent image forming means; a switching means which is selectively driven, to directly transmit the recording data from the recording-data generating means to the latent image forming means, or to transfer the recording data from the recording-data generating means to the latent image forming means after a delay incorporated by the shift register with taps, or to block the signal input from the recording-data generating portion, once feeding the data of one duplicate into the shift register with taps is completed, and fed back the output signal of the shift register with taps to the input terminal on the shift register with taps and recursively transmit the output signal to the latent image forming means; and a tap switching means which selects an input tap and/or output tap, when circulating the output signal.

This shift register with taps may be a one-component shift register having taps, or a may be a group of samll capacity shift registers connected in series and having taps connected to the contacts.

Figure 4:
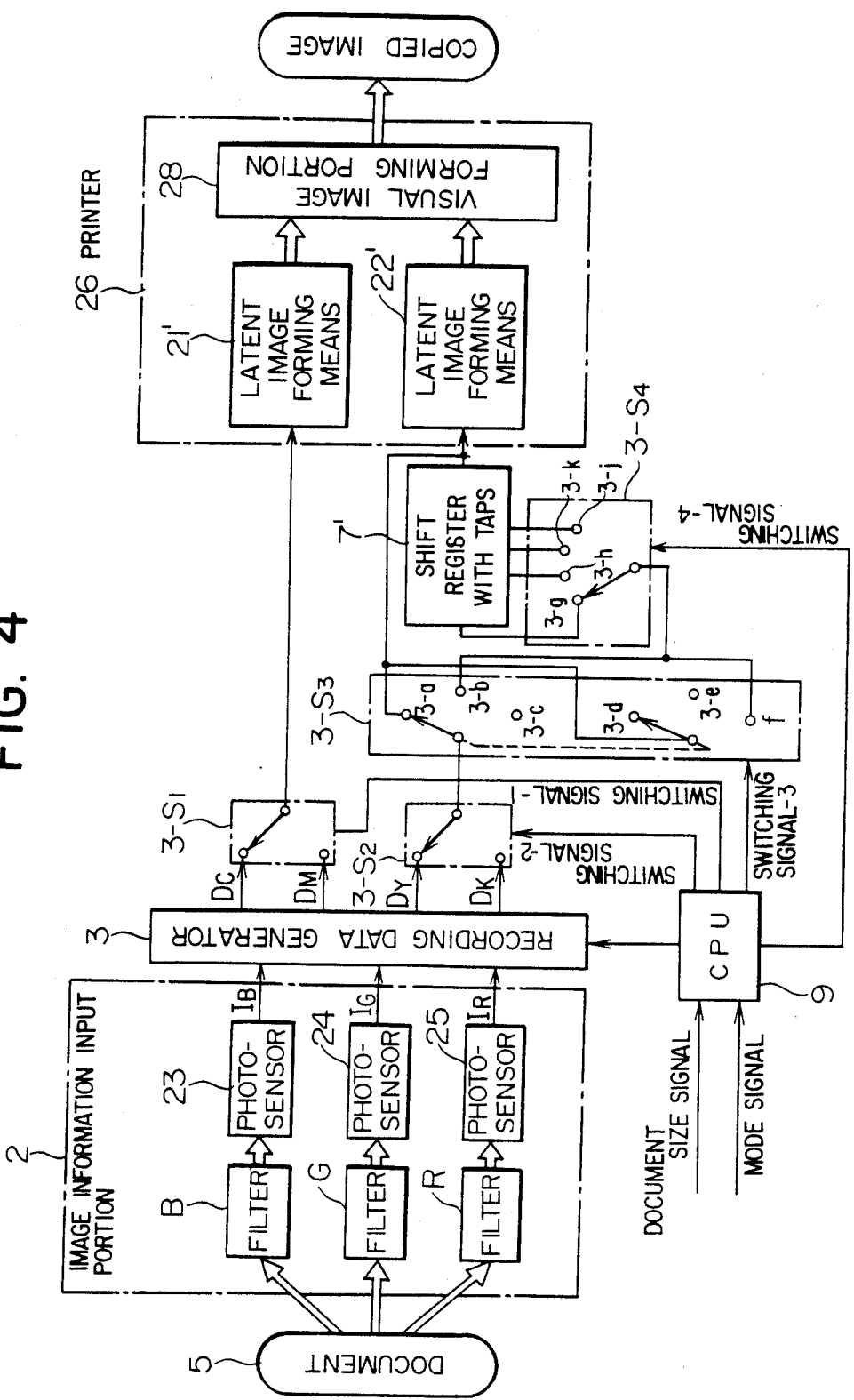

The typical apparatus embodying the present invention is shown in FIG. 4 (in FIG. 4, components with like symbols and numerals have like operation and effect as same as those having like symbols and numerals in FIGS. 1 and 2).

The recording data selected by a switch 3-$S_1$ ($D_M$ or $D_C$) are transferred to the latent image forming means 21' (e.g. laser beam scanner) which immediately performs latent image forming.

On the other hand, the recording data selected by a switch 3-$S_2$ ($D_Y$ or $D_K$) are transmitted to the latent image forming means 22' via a different route according to the recording mode, based on the switching signal that is generated by the CPU 9 upon receiving the recording mode signal.

In the multi-color image recording mode, contacts 3-$b$ and 3-$e$ on a switch 3-$S_3$ are actuated by the switching signal from the CPU 9, thereby the recording data ($D_Y$ or $D_K$) are temporarily stored in the shift register with taps 7'. The shift register with taps 7' transfers the stored recording data to the latent image forming means 22' after a duration required for the image carrying member 1 to travel rotatively the distance between the latent image forming means 21' and 22'. As a result, the recording data are transmitted to the latent image forming means 22' with a delay equal to this duration. Therefore, the image positions formed by the latent image forming means 21' and 22' are accurately aligned with each other. In the identival-image single-color recording mode, the contacts 3-$a$ and 3-$d$ on the switch 3-$S_3$ are actuated, thereby the recording data from the recording-data generating portion 3 are directly transmitted to the latent image forming means 22', thus the time required for image inputting through outputting is reduced.

In the identical-image single-color continuous recording mode, the input tap on the shift register with taps 7' is designated by a switch 3-$S_4$ according to the size of a document image, and the contacts 3-$b$ and 3-$e$ on the switch 3-$S_3$ are actuated. Consequently, the image information input portion 2 and the recording-data generating portion 3 are energized, thereby the recording-data generating portion 3 inputs the recording data (e.g. $D_Y$) into the shift register with taps 7' via the switches 3-$S_2$ and 3-$S_3$. Once the recording data of one duplicate is fed into the shift register with taps 7', the contacts 3-$c$ and 3-$f$ on the switch 3-$S_3$ are actuated to block the signal input from the recording-data generating portion 3, thereby the output signal of the shift register with taps 7' is fed back to the input terminal on the shift register with taps 7' in order to re-cycle the signal. Consequently, the output signal is recursively fed into the latent image forming means 22'. Thus, continuous recording of the large number of identical signle-color image is accomplished in a shorter duration, compared to a conventional apparatus.

Although the shift register with taps, where input tap is selected, is used in the embodiment above, the shift register with taps where the output tap can be similarly selected may be used for achieving the similar object of the invention.

As described above, the image forming apparatus embodying the present invention is provided, between the output terminal on the recording-data generating means and the input terminal on the latent image forming means, with the shift register with taps, and the tap switching means which is selectively driven to change circuit connection, wherein this apparatus has the following advantages: in the multi-color image recording, a multi-color image is formed by operating the shift register with taps as delaying means; in the single-color high-quality image recording, a high-graduation image is obtained by directly feeding the recording data from the recording-data generating means into the latent image forming means. Additionally, when continuously recording an identical single-color image whose document size in the sub-scanning direction is smaller than the maximum copying size, the operation time for continuously recording an identical single-color is further reduced, compared to the shift register without taps, since the tap switching means selects an appropriate tap on the shift register in order to reduce time for re-cycling recording data. Consequently, the image forming apparatus of which components have longer service lives, wherein power consumption is reduced.

The scope of recording mode switching means useful in embodying an apparatus described above, shown in any of FIGS. 2 through 4 is not limited only to the circuit above comprising these switches, and any constitution of a circuit which satisfies the like requirements may be used for the present invention.

Figure 5:
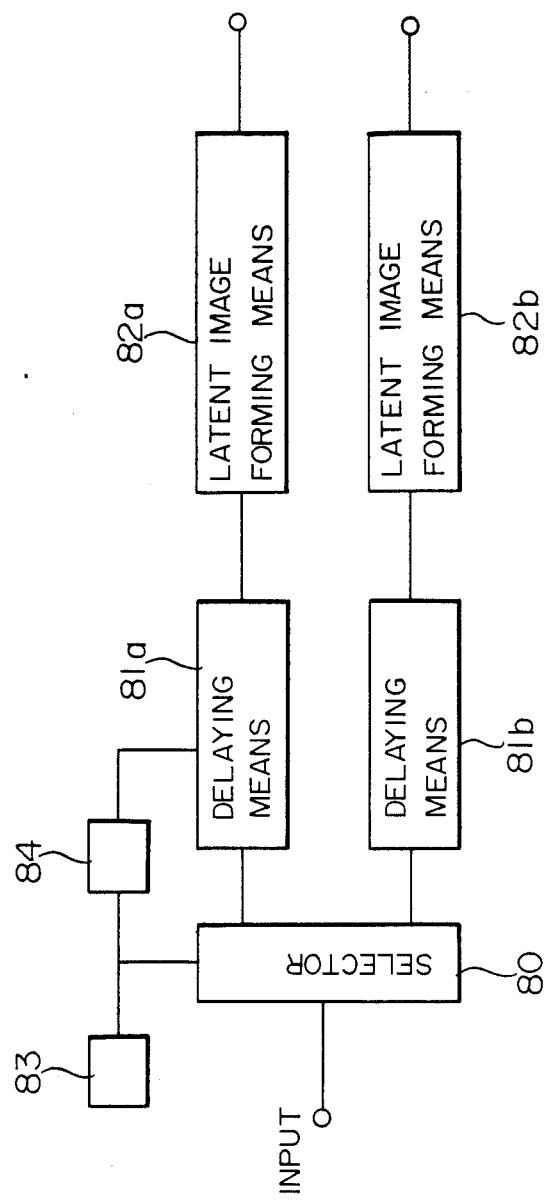
FIG. 5 describes the scheme of serial data transmission.
Figure 6A:
FIG. 6 is a timing chart showing the operation of the apparatus in FIG. 1 with the line sequential of image data format.
Figure 6B:
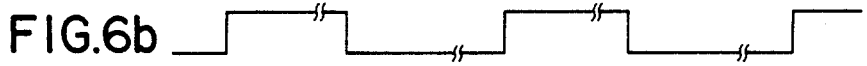
Figure 6C:
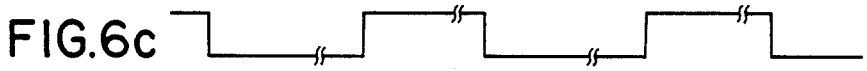
Figure 6D:
Figure 6E:
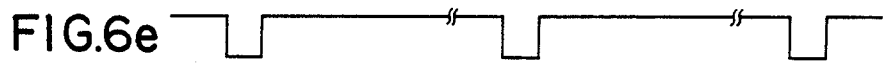
Figure 6F:
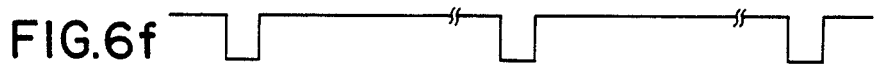
Figure 7A:
FIG. 7 is a timing chart showing the operation of the apparatus in FIG. 1 with the dot sequential of image data format.
Figure 7B:
Figure 7C:
Figure 7D:
Figure 7E:
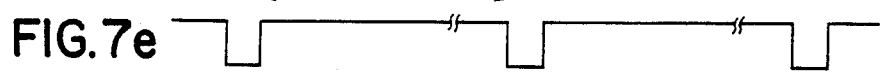
Figure 7F:
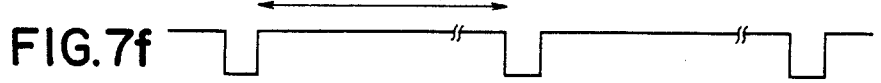

FIG. 5 illustrates the basic concept of the present invention for processing serial image data. In this embodiment, the image data with two color components is exemplified as one example, however, the basic principle similarly applies, regardless of the number of independent colors. In FIG. 5, the image data are entered based on the clock pulse of a frequency $\alpha$ generated by a clock pulse generator 83, wherein by virtue of a selector 80 the image data of a first color component are transferred to a delaying means 81$a$, while the image data of a second color component are fed into a delaying means 81$b$. The delaying means 81$a$ and 81$b$ transmit the received image data, correspondingly, to the latent image forming means 82$a$ and 82$b$, based on the clock pulse of a frequency $\alpha/2$ generated by a frequency divider 84 which divides the original frequency $\alpha$. As a result, the image data are inputted or outputted without an excessive delay, and imagewise exposure to form latent image on the image carrying member is concurrently performed. For aligning positions of the latent images of the respective color components with each other on the image carrying member, the timing for inputting the clock pulse into the delaying means 81a and 81b is properly controlled. For the line sequential data transfer, a selector operates per line on an image; and for the dot sequential data transfer, the selector operates per pixel.

FIG. 6 is a timing chart which describes the operation of the apparatus in FIG. 5, where the line sequential data transfer is performed as one example. FIG. 6 (a) represents the clock pulse of a frequency $\alpha$. In (b) and (c), the image data are alternately transferred per line to the delaying means 81a and 81b by a selector. FIG. 6 (d) represents the clock pulse of a frequency $\alpha u/2$, which is fed into the latent image forming means 82a and 82b. As shown in (e) and (f), the image data are transferred, based on the clock pulse above, to the latent image forming means 82a and 82b. The two groups of image data simultaneously transmitted to the latent image forming means 82a and 82b are not data to be aligned with each other at the same position on one screen, but they are respectively the data where one of data are lagged behind the other due to the difference in latent image forming positions. Accordingly, the delaying times of the two delaying means differ greatly.

FIG. 7 is a timing chart which describes the operation of the apparatus in FIG. 5, where the dot sequential data transfer is performed as another example. FIG. 7 (a) represents the clock pulse of a frequency $\alpha$. In (b) and (c), the image data are alternately transferred per pixel to the delaying means 81a and 81b via a selector. The meanings of (d), (e) and (f) are identical with those in FIG. 6.

As described above, the apparatus embodying the present invention is capable of dealing with the screen sequential input as well as line and dot sequential input.

FIG. 8 is a timing chart which describes changes in delaying time according to the size of an image. In this figure, the screen sequential data input is exemplified as the serial data. The difference in operation time between the first and second latent image forming means results from an arrangement for aligning the positions of independent color images on the image carrying member. The time delay between the image data input and the image data transfer to each delaing means is required for image processing or the like. In this figure, t represents a duration from the image data transfer to the delaying means, to the start of latent image forming.

FIG. 8 (a) describes the case where comparatively small size image data is inputted. Sequence is arranged so as to eliminate any delay in the processes of the second color latent image forming and the fourth color latent image forming. According to this arrangement, a delay time $t_1$ is incorporated into the delay means for 1st latent image forming means in the process of the first color image forming, because the first color image is inputted prior to input of the second color image data; the similar time $t_1$ is also incorporated in the process the third color image forming, because the third color image is inputted prior to input of the fourth color image data. Additionally, the image data inputting is interrupted between the second color inputting and the third color inputting, since the size of the image data in the case of FIG. 8-a is small.

FIG. 8 (b) represents the case where image data of a larger size are inputted. In this figure, the timing is arranged so that there is no time delay in th process of the fourth color latent image forming. The image data is entered without interruption, since the size of the image data is large. The first, second and third colors image data, which have been entered preveously to the fourth color image data, have time delays corresponding to the durations of t2, t3 and t4, respectively, for image data transfer to the latent-image forming means.

FIG. 8 (c) illustrates the image data input of which size identical with the counterpart in FIG. 8 (b). Unlike FIG. 8 (b), no time delay is incorporated for the image data transfer. In FIGS. 8 (a) and (b), a two-color latent image is formed per rotation of the image carrying member. In FIG. 8 (c), however, a one-color latent image is formed per rotation of the image carrying member, resulting in a longer image forming time. Moreover, the image data input is interrupted during the operation. Yet, the example described in FIG. 8 (c) is advantageous, since no delaying means is required.

As mentioned above, the multi-color image forming apparatus is capable of dealing with the serial image data input (screen sequential) is provided, according to this arrangement.

The multi-color image forming apparatus shown in FIG. 1 incorporating the embodiment of this concept is described below in detail.

Figure 9:
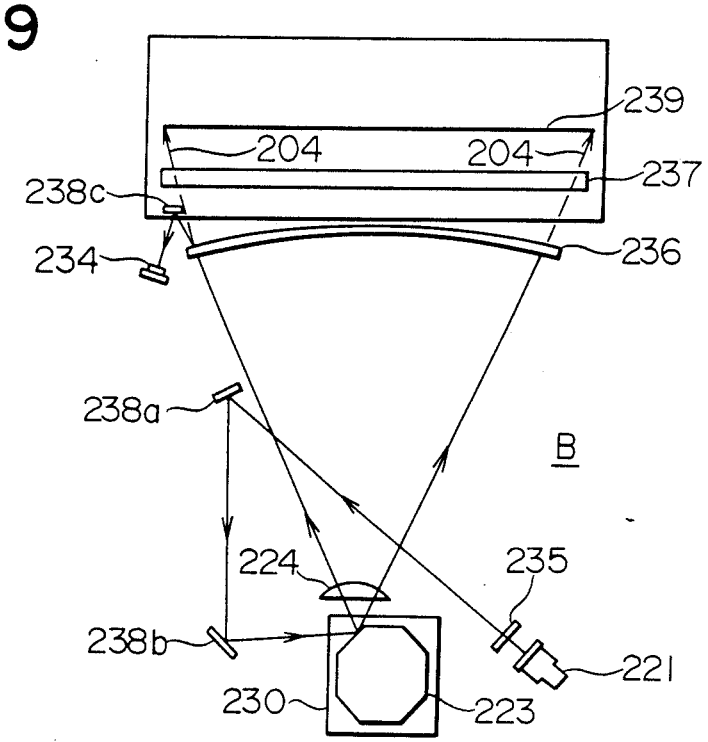
FIG. 9 illustrates a laser beam scanner incorporated into the multi-color image forming apparatus in FIG. 1.

FIG. 9 shows a laser beam scanner used in the multi-color image forming apparatus in FIG. 1. A laser beam emitted from a laser diode, which flashes at high speed based on image data, is projected to a polygon mirror 223 rotated by a driving motor 230. The laser beam is then reflected by the mirror surface on the polygon mirror 223 to the reflecting mirror 237 via a f-$\theta$ lens 224, and scans on the image carrying member. Numeral 234 denotes an index sensor which detects the scanning position of the beam. Numerals 235 and 236 denote cylindrical lenses for inclination angle correction. Numerals 238a, 238b and 238c denote reflecting mirrors.

FIG. 11 illustrates an image reader which is one of peripheral units to feed image data into the multi-color image forming apparatus in FIG. 1. Numerals in FIG. 11 (a) are defined as follows. Numeral 137 denotes a document presser which presses a document 100 onto a document table. Numeral 102 denotes an exposing lamp which irradiates the document 100. Numerals 138 a, b and c, and numeral 103 represent mirrors and a lens for converging a light image of the document 100 on an one-dimensional image sensor 104. The arrows indicate the moving directions of exposing lamp and mirror for the scanning on the document 100. The one-dimensional image scanner 104 is a CCD image sensor in which sensor elements are densely arranged in one dimension each of which has either one of blue, green or red filter layer. These filters constitute a micro cyclic mosaic filter. The light image of the document 100 is projected to each sensor element 141 and photoelectrically converted. Driven by biphasic driving pulses 143 $\phi_1$ and $\phi_2$, at a rate in compliance with the pulse frequency of a transfer gate pulse 144, the resultant electrical signal is allowed to scan in a CCD shift register 145, and transmitted to the output terminal 146.

Figure 10:
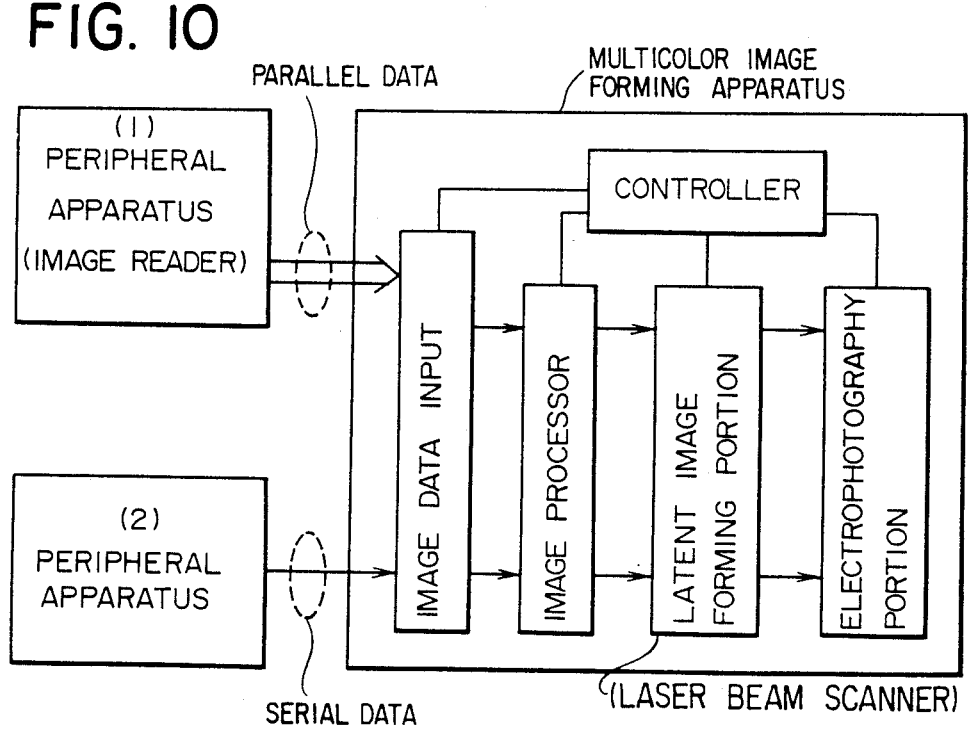
FIG. 10 illustrates an image reader which is one of peripheral units for entering image data to the multi-color image forming apparatus in FIG. 1.

FIG. 10 is a block diagram of a system incorporating the multi-color image forming apparatus in FIG. 1. Data entry units as a data introducing means for the system includes (1) a peripheral unit which enters parallel data; and (2) a peripheral unit which enters serial data. As for unit (1), the image reader in FIG. 11, or the like, is used, and unit (2) is, for example, an image storage unit or communication equipment. Using these units, the image data are entered into the image data input portion. Consequently, the information regarding attribute of the entered image (parallel or serial) is inputted into the controlling portion to determine the overall sequence of the multi-color image forming apparatus. The image processing portion performs image processing for the inputted data and transmits them to the latent image forming means. The latent image forming means includes a delaying means and forms a latent image on the image carrying member in an electrophotographic portion, by controlling the timing of latent image forming in accordance with the data format of the entered image data.

Figure 12:
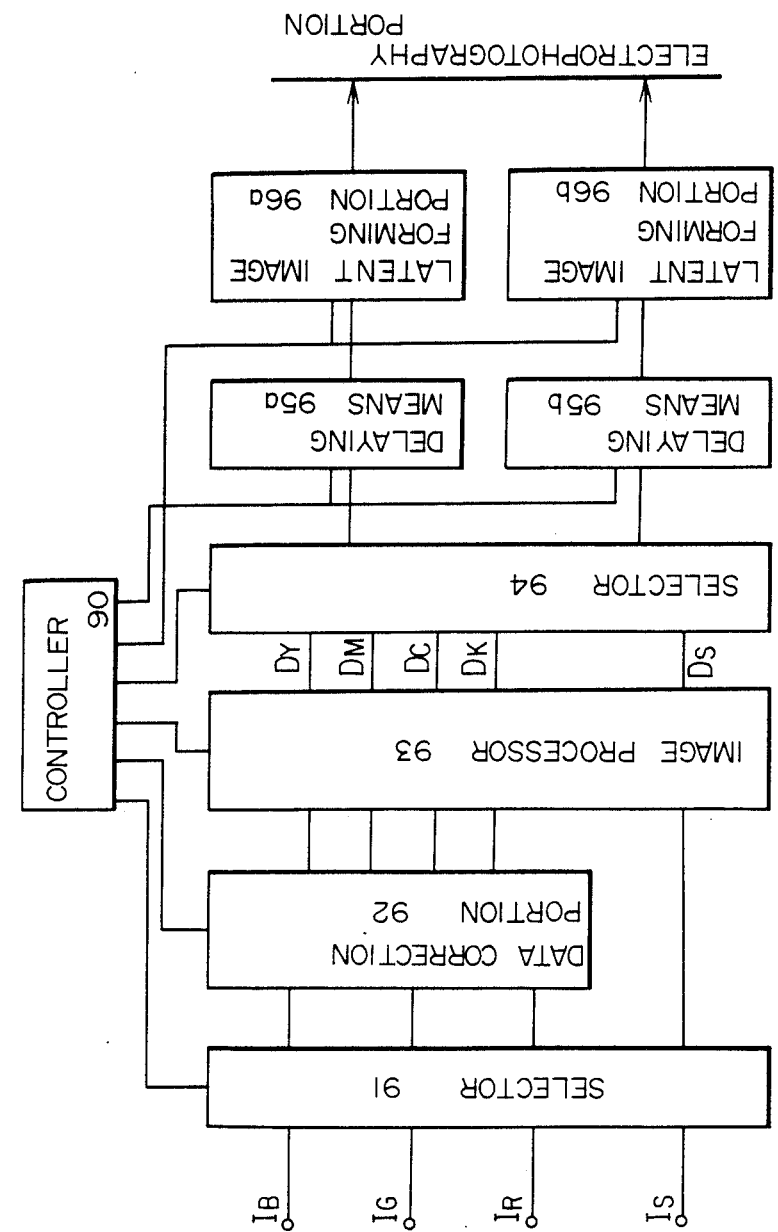
FIG. 12 is a block diagram illustrating the data flow in the multi-color image forming apparatus in FIG. 1.

FIG. 12 is a block diagram, showing the data flow in the multi-color image formaing apparatus. The apparatus is capable of processing, either when three independent color components $I_B$, $I_G$, $I_R$ (blue, green and red, respectively) are parallelly entered, or when a plurality of color components are serially entered in the data format such as screen sequential. Each portion functions based on a common clock pulse from the controlling portion 90.

The parallel data $I_B$, $I_G$ and $I_R$ electrical signals which are obtained by transmitting the original light image via filters B, G and R to a photoelectric conversion element, such as a single-dimension image sensor. After these signals being entered by a selector 91, a data correction portion 92 performs shading correction and gamma correction as well as image enlarging or reducing, based on the control signal from the controlling portion 90, thereby masking and URC processing is subsequently performed in order to form four-color component data (yellow, magenta, cyan and black). The masking and UCR processing allow conformity of reading properties of the photoelectric transfer means with recording properties of the multi-color image forming apparatus. Next, the image processing portion 35 forms binary or multi-value coded recording data $D_Y$, $D_M$, $D_C$ and $D_K$, according to the dither method or similar method. The recording data $D_Y$, $D_M$, $D_C$ and $D_K$ are parallelly outputted. Two latent image forming means 96a and 96b (imagewise exposing means) are respectively inputted either one type of the recording data selected by the selector 94. Two delaying means 95a and 95b are disposed between the selector 94 and two latent image forming means 96a and 96b. The delaying means 95a does not cause any delay in this mode (parallel data format). The recording data selected by the selector 94 and transferred to the delaying means 95a (e.g. $D_M$ or $D_C$) are directly fed, without a time delay, into the latent image forming means 96a which performs latent image forming. The recording data selected by the selector 94 ($D_Y$ or $D_K$) are delayed by the delaying means 95b for a specific duration to allow latent image forming at optimum timing. After the delay, the above recording data are transmitted to the latent image forming means 96b which performs imagewise exposure to form latent image on the image carrying means of electrophotography portion. As a result, the positions of the respective color images are accurately aligned with each other.

Serial data $I_S$ are entered, for example, screen-sequentially per independent color, from the image memory unit or communication equipment. The serial data are loaded into the selector 91, and processed by the image processing portion, when necessary, to be converted into recording data $D_S$. Consequently, the selector 94 transfers the recording data $D_S$ to the delaying means 95a and 95b, based on color information and data format. The delaying means 95a and 95b delays the data transfer for a required duration, according to the timing chart described later.

Such a delaying means has such a function as a shift register where data are sequentially transferred based on an external clock pulse through serially connected recording cells, wherein the means comprises a bipolar, MOS, CCD, BBD or the like.

FIG. 13 is a timing chart illustrating the sequence where parallel data are introduced into the system.

FIG. 14 is a timing chart illustrating the sequence where serial data are introduced into the system. More specifically, FIG. 14 (a) is for comparatively small-size image data, while FIG. 14 (b) is for comparatively large-size image data. In FIG. 14 (a), to allow proper timing for latent image forming, the delaying means (1) alone operates when smaller-sized image is used. In FIG. 14 (b), unlike 14 (a), two delaying means operate for larger-sized image data.

The larger image data, as shown in FIG. 14 (b), extends a delay time, requiring a larger storage capacity for the memory serving as delaying means. Accordingly, as described in FIG. 8 (c), a method of latent image forming, where a latent image is formed without using delaying means, by only actuating latent image forming means per rotation of the image carrying member, may be preferably used as one example of the present invention. According to this arrangement, when forming one 4-color-component image, for example, the image carrying member has to be rotated four turns. However, the required memory capacity may be reduced according to this method.

The example in FIG. 1 is provided with two sets of latent image forming means, wherein line sequential, dot sequential or screen sequential data with two color components are processed per rotation of the image carrying member. When the image data have four components, image processing is performed by using, for example, the following methods:

(1) To transfer the entire image data twice, and samples twocolor component image data per transfer.

(2) To incorporate an image memory between a peripheral unit and input means; and to transfer two-component color image data first, and feed and store the remaining image data into the image memory, thereafter, to transfer the stored data upon next latent image forming.

Figure 15:
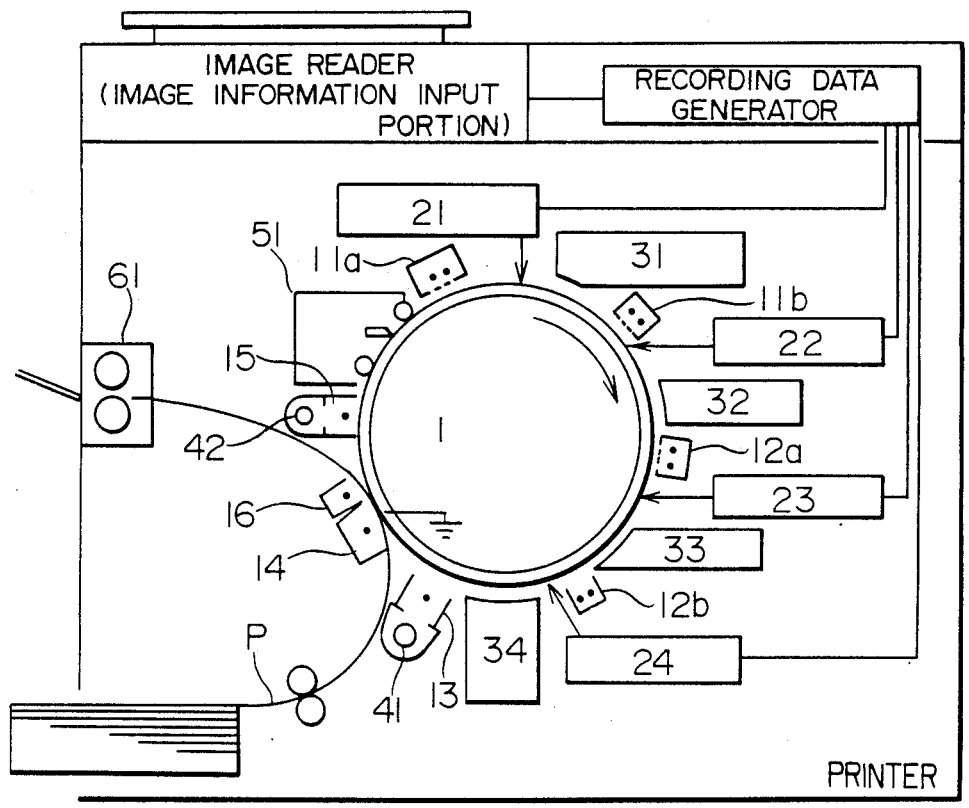
FIG. 15 shows still another example embodying the present invention.
Figure 16:
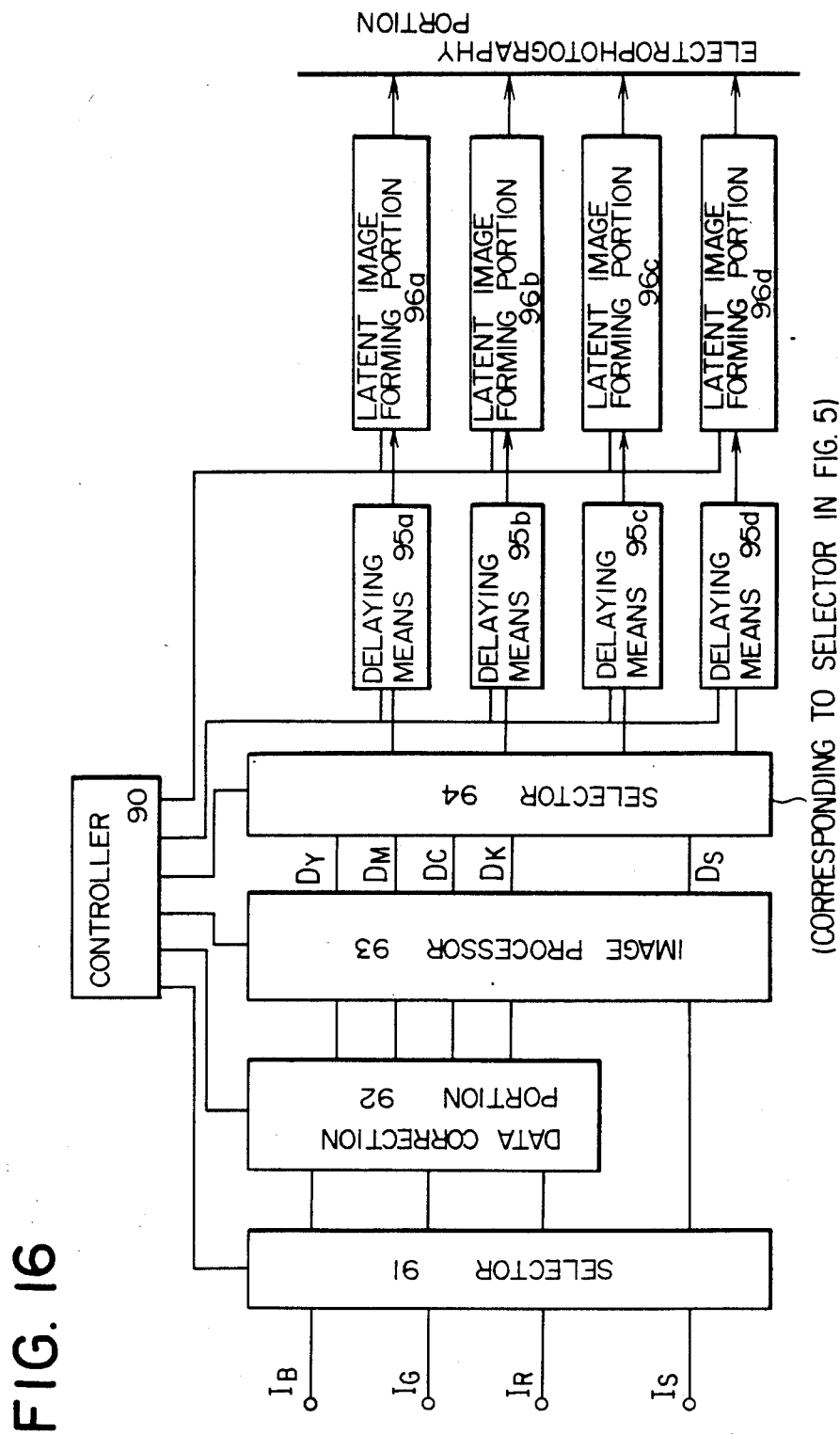
FIG. 16 is a block diagram showing the data flow in the multi-color image forming apparatus in FIG. 15.

When using an apparatus with four latent image forming means, four-color component image data can be readily processed. The similar apparatus is described in FIG. 15, and the block diagram illustrating the data flow for the apparatus is shown in FIG. 16; like symbols and numerals in FIGS. 15 and 16 are synonymous with like symbols and numerals in FIGS. 1 and 12.

Figure 17:
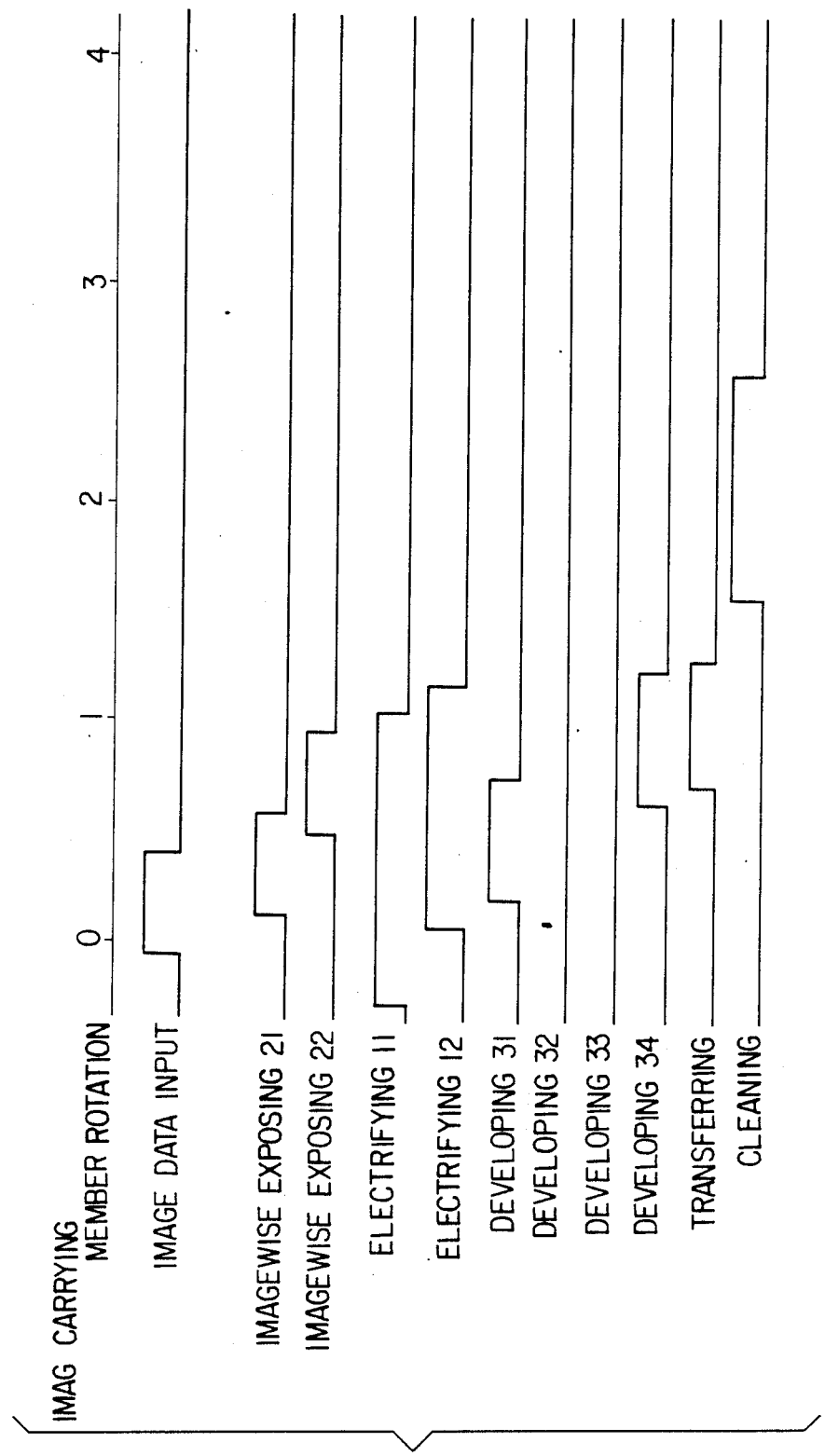
FIG. 17 is a timing chart showing the sequence where the system in FIG. 15 inputs line sequential data or point sequential data (two colors).
Figure 18:
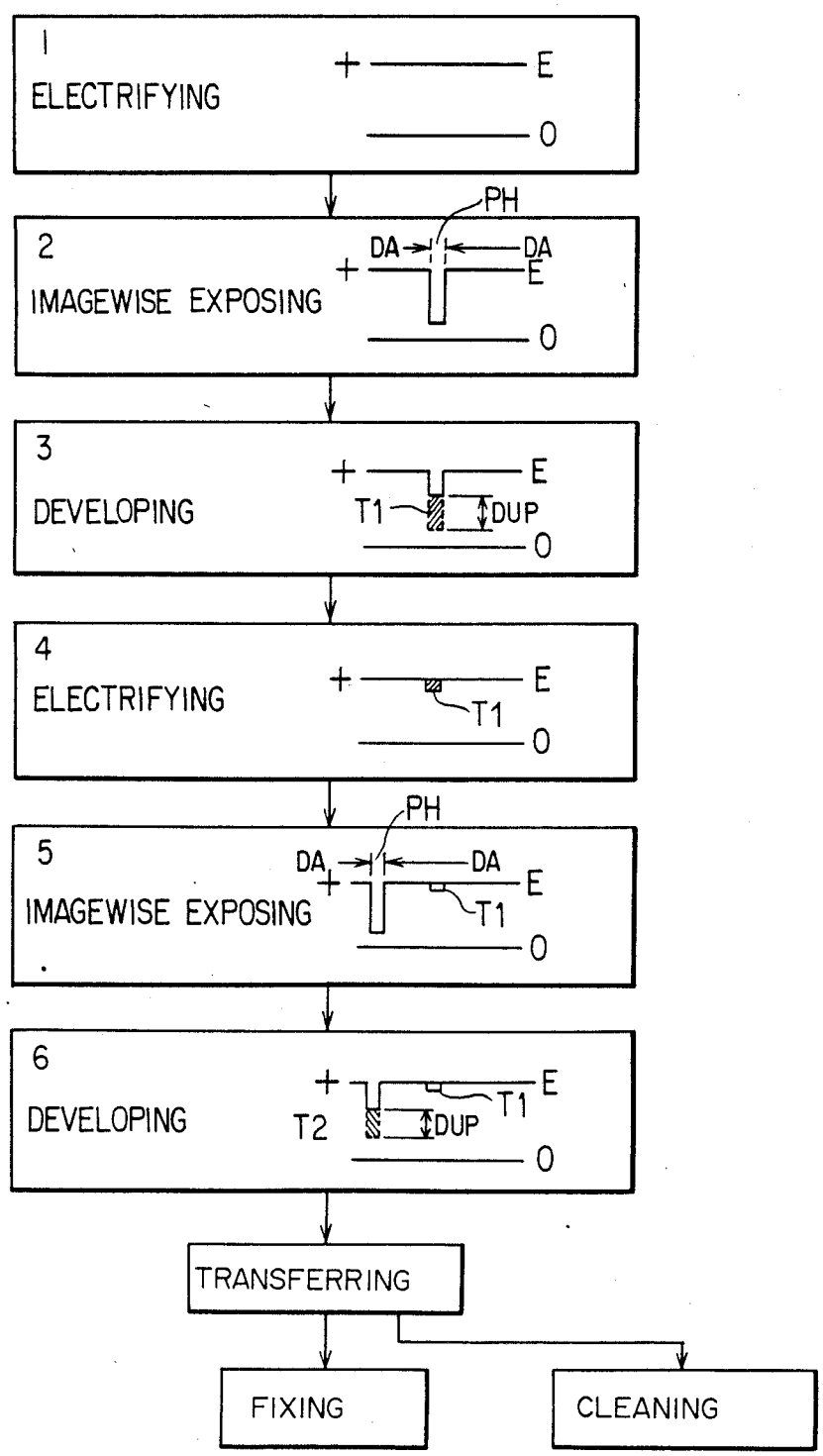
FIG. 18 describes the change in potential on an image carrying member.
Figure 19:
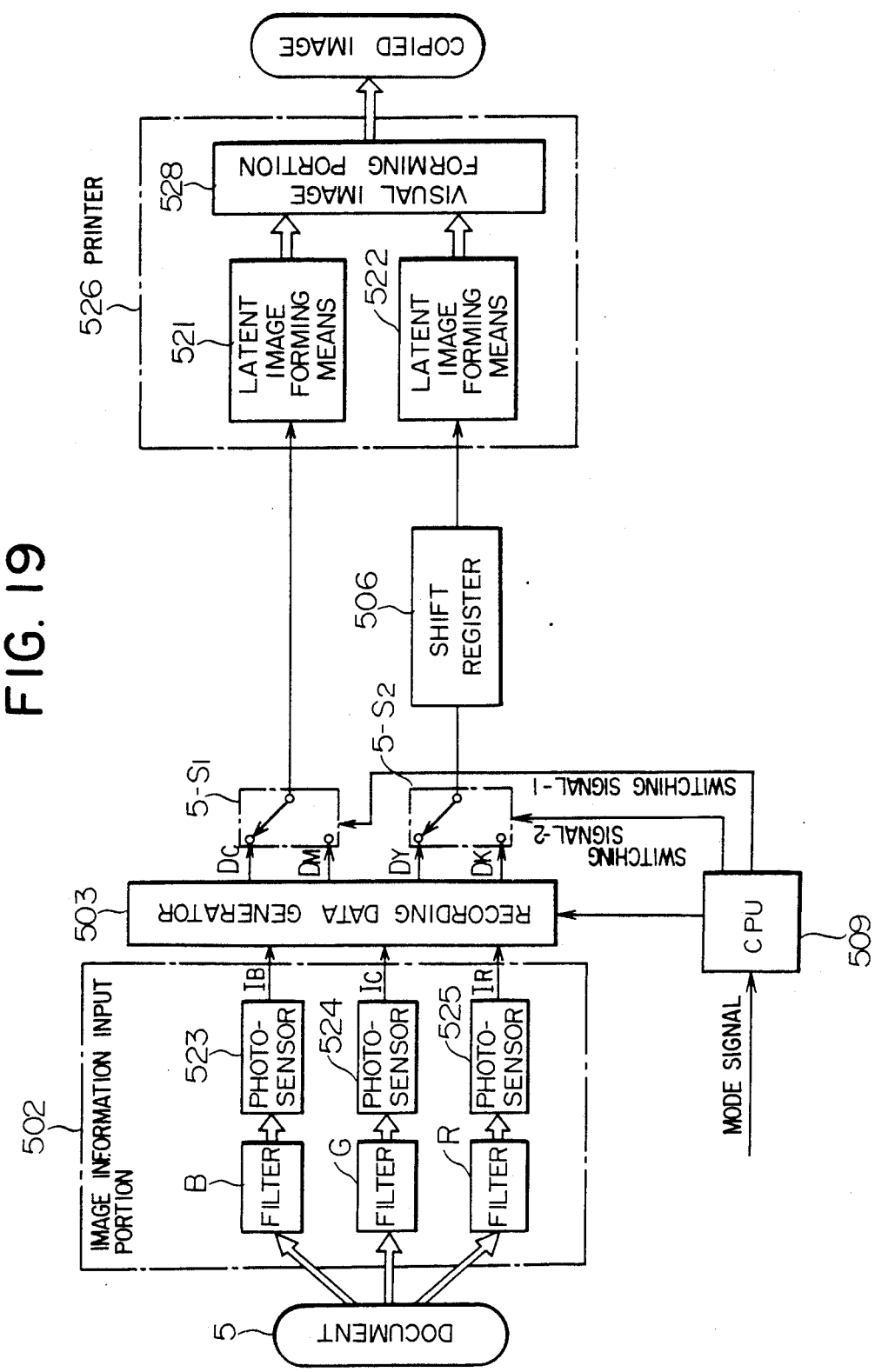
FIG. 19 is a block diagram showing the image-data flow where a conventional multi-color image forming apparatus functions as a copying apparatus.

FIG. 17 is a timing chart illustrating the sequence where the system entering serial data (two colors).

To embody the present invention, novel techniques as described below are required in an electrophotographic process and the like.

When forming a multi-color image, a first formed toner image should be stably maintained without being disturbed until a transfer process. For this reason, a developing method (known as "contact developing method") where toner is adhered onto the latent image by a magnetic brush which rubs the surface of the image should not be adopted.

Therefore, the inventors of the present invention employed the non-contact developing method, wherein the toner powder jumps to the latent image, whereby the magnetic brush does not come into contact with the image carrying member 1.

The non-contact developing method is characterized in that since the magnetic brush does not come into contact with the latent image surface, the already developed toner is not subjected to an external mechanical force, whereby a stable and high-resolution image is obtainable. This method requires, however, application of external force which is different from that employed in the contact developing method, whereby only the toner particles alone are allowed to jump, while the carrier particles are not allowed to do so. To achieve this application, it is mandatory to apply proper magnetism or electrical bias. The latter is especially important for the non-contact developing method.

In the non-contact developing method, excessively large gap between the magnetic brush and image carrying member 1 reduces coulomb force exerting upon toner particles, resulting in the blurred image. Thus, the gap should be as small as possible.

When forming a multi-color image, the electrifying process is incorporated, immediately before second latent image forming for second independent color onwards, in order to ensure uniform surface potential on the image carrying member 1. If the polarity in the electrifying process does not match the charged polarity on the toner of the toner image formed on the image carrying member 1, the charged potential level of the toner becomes uneven, adversely affecting the following processes including the transfer process. Thus, the developing method should employ reversal development, wherein the toner powder adheres to an area of lower potential.

The conditions for the above-mentioned developing unit, development method and developer are preferably those described in detail in Japanese Patent O.P.I. Publication Nos. 131382/1984, 222847/1984, 2228511984 through 222853/1984, and Japanese Patent Application No. 192172/1985, each being previously applied by the present applicant.

Additionally, in this process, the potential on a portion where the toner has been already deposited should be reduced in order to align the second toner image with the first toner image. Accordingly, it is mandatory that, when using a laser beam scanner, a beam from the laser beam scanner is efficiently transmitted through the toner. The example of preferable lasers are defined as follows: a laser, especially a semiconductor laser, of which wavelenth region is higher than 750 nm range which is a transmission wavelength for most of lasers.

The typical criterial for embodying the present invention are described as follows.

Table 1 lists the criteria for an image reader.

TABLE 1

| Image sensor | Contact image sensor B, G, R mosaic filters |
|---|---|
| Resolution | 16 dot/mm |
| Reading velocity | 100 mm/s (Sub-scanning direction) |

The image processing portion performs the shading rectification, gamma correction, image enlarging or reducing, masking, UCR processing, dither processing and other specified image processing on the entered paralled data so as to form binary data $D_Y$, $D_M$, $D_C$ and $D_K$. As for the serial data, the image processing portion performs specific processing and forms binary data D.

Criteria for the latent image forming means and electrophotographic portion are listed in Table 2.

TABLE 2

| Latent image forming means | |
|---|---|
| Light source | Semiconductor laser |
| Primary wavelength | 780 nm |
| Intensity | 40 erg/cm$^2$ |
| Distance between two latent image forming means | 218.2 mm |
| Positive image forming portion | |
| Image carrying member | OPC drum (Diameter 200 mm) Rotation at linear velocity speed 100 mm/s (c.w.) |
| Developing unit | Sleeve (Diameter 20 mm) Rotation at linear velocity 370 mm/s only during developing (c.c.w.) Magnet roll (contained in sleeve) 12 poles Rotation at 1100 r.p.m. only during developing (c.w.) |

Table 3 shows criteria for developing. The developing units 31, 32, 33 and 34 in FIG. 1 contains two color component developer, respectively for cyan (C), magenta (M), yellow (Y), black (K) colors.

TABLE 3

| Latent image potential | −700 V (Non-exposure portion) −100 V (Exposure portion) |
|---|---|
| Development bias | −600 V (DC) 1 ~ 2 KV$_{p-p}$ 3 KHz (AC) |
| Development gap (Distance between image carrying member and sleeve) | 0.5 mm |
| Developer thickness on sleeve | 0.4 mm (Max.) |
| Developer | Two-component developer (carrier:toner = 9:1, by weight) |
| Toner | Mean particle diameter 9 μm Specific resistance More than 10$^{14}$ Ω cm Non-magnetic |
| Carrier | Mean particle diameter 30 μm Specific resistance More than 10$^{14}$ Ω cm Maganetization 27 emu/g Resin-coated carrier |
| Sequence of developing | C → Y → M → K M → Y → C → K C → K → M → Y M → K → C → Y |

To describe the embodiment according to the present invention, the image reader using the CCD image sensor is used as a peripheral unit to input parallel data, the image storage and communication equipment are used as a peripheral units to input serial data. These units, however, are not essentially binding the present invention. As for a latent image forming means, the optical system using a laser is exemplified in the embodiment. Instead, an optical system using LED, CRT or liquid crystal shutter may be used. Although the apparatus embodying the present invention is provided with two latent image forming means, more than two latent image forming means may be used in embodying the present invention.

The present invention provides a multi-color image forming apparatus which is capable of coping with an image data inputting method, either a parallel or serial (screen sequential), and forming multi-color images at high-speed.

What is claimed is:

1. An image forming apparatus comprising
a data introducing means for introducing an image data having plural color components which are arranged in either one of at least two kinds of data format,
an image carrying means for producing an image thereon,
at least two sets of writing means for writing the image data onto said image carrying means, the respective sets of said writing means being assigned a color component of the image data to be written,
a transmission means for transmitting the image data from said data introducing means to said writing means, said transmission means having
a selection means for selectively transmitting respective color components of the image data into a corresponding set of said writing means and
a timing means for adjusting the transmission timing of the respective color components of the image data, and
a control means for controlling said timing means in accordance with both the kind of data format and the kind of the color components of the introduced image data.

2. The apparatus of claim 1,
wherein said writing means comprises a light exposure means for performing a light exposure onto said image carrying means.

3. The apparatus of claim 1,
wherein said image carrying means is rotatable.

4. The apparatus of claim 1,
wherein said image carrying means produces a latent image thereon in response to said light exposure.

5. The apparatus of claim 1,
wherein said transmission means transmits the image data with a transmitting timing pulse, and
wherein the outlet frequency of the transmitting timing pulse is adapted to differ from the inlet frequency of the transmission timing pulse.

6. The apparatus of claim 1,
wherein said data introducing means contols an introducing manner thereof so that the time period from the start of forming a latent image till the end of developing the latent image is kept to be a predetermined period regardless of the kind of data format of the introduced image data.

7. The apparatus of claim 1,
wherein the rotation number of said rotatable image carrying means is determined in accordance with the data size of the introduced image data.

8. The apparatus of claim 1,
wherein said at least two kinds of data format comprise a first format for dealing with parallel image data whereby all of said plural color components of said image data are transmitted simultaneously, and a second format for dealing with serial image data whereby each of said plural color components of said image data is transmitted respectively.

9. An image forming apparatus comprising
a data introducing means for introducing an image data having plural color components which are arranged in either one of two data formats,
wherein said two data formats are a first format for dealing with parallel image data whereby all of said plural color components of said image data are transmitted simultaneously, and a second format for dealing with serial image data whereby each of said plural color components of said image data is transmitted respectively,
an image carrying means for producing an image thereon,
two sets of writing means for writing the image data onto said image carrying means, the respective sets of said writing means being assigned a color component of the image data to be written,
a transmission means for transmitting the image data from said data introducing means to said writing means, said transmission means having
a selection means for selectively transmitting respective color components of the image data into a corresponding set of said writing means and
a timing means for adjusting the transmission timing of the respective color components of the image data, and
a control means for controlling said timing means in accordance with both the kind of data format and the kind of the color components of the introduced image data.

* * * * *